(12) United States Patent
Anazawa et al.

(10) Patent No.: US 7,364,709 B2
(45) Date of Patent: Apr. 29, 2008

(54) MANUFACTURING APPARATUS AND METHOD FOR CARBON NANOTUBE

(75) Inventors: Kazunori Anazawa, Nakaimachi (JP); Hiroyuki Watanabe, Nakaimachi (JP); Kentaro Kishi, Nakaimachi (JP); Masaki Hirakata, Nakaimachi (JP); Masaaki Shimizu, Nakaimachi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 876 days.

(21) Appl. No.: 10/476,566

(22) PCT Filed: Oct. 30, 2002

(86) PCT No.: PCT/JP02/11305
§ 371 (c)(1),
(2), (4) Date: Nov. 4, 2003

(87) PCT Pub. No.: WO2004/039723
PCT Pub. Date: May 13, 2004

(65) Prior Publication Data
US 2004/0241339 A1    Dec. 2, 2004

(51) Int. Cl.
*B01J 19/08* (2006.01)
(52) U.S. Cl. .............. 422/186.21; 204/173; 423/445 R
(58) Field of Classification Search ........... 422/186.21; 204/176, 173; 423/445 R
See application file for complete search history.

(56) References Cited

U.S. PATENT DOCUMENTS 6,855,231 B2 * 2/2005 Kajiura et al. ......... 204/157.15
6,902,655 B2 * 6/2005 Anazawa et al. ........... 204/176

FOREIGN PATENT DOCUMENTS

| EP | 0 665 187 A1 | 8/1995 |
| JP | A 58-185767 | 10/1983 |
| JP | A 8-48510 | 2/1996 |
| JP | A 2002-69756 | 3/2002 |
| JP | A 2002-356316 | 12/2002 |

OTHER PUBLICATIONS

Thess, "Crystalline Ropes of Metallic Carbon Nanotubes," Science, vol. 273, pp. 483-487, Jul. 26, 1996.
Anazawa, "High-purity carbon nanotubes synthesis method by an arc discharging in magnetic field," Applied Physics Letters, vol. 81, No. 4, pp. 739-741, Jul. 22, 2002.

* cited by examiner

*Primary Examiner*—Kishor Mayekar
(74) *Attorney, Agent, or Firm*—Oliff & Berridge, PLC

(57) ABSTRACT

A manufacturing apparatus, including: two electrodes whose forwardmost end portions are opposed to each other; a power supply which applies a voltage between the electrodes in order to generate discharge plasma in a discharge area between the electrodes; and plural magnets that form a magnetic field in the generation area of the discharge plasma by generating a magnetic field from a magnetic pole surface of each of the plural magnets that are arranged to have the magnetic pole surfaces thereof opposed to one imaginary axis within a space; and of the two electrodes, at least a part of one electrode is located in an area surrounded by: an imaginary plane formed by connecting end portions of the magnetic pole surfaces of the plural magnets on one side in a direction of the imaginary axis.

22 Claims, 15 Drawing Sheets

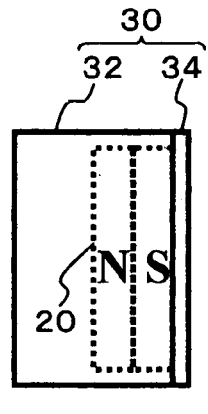 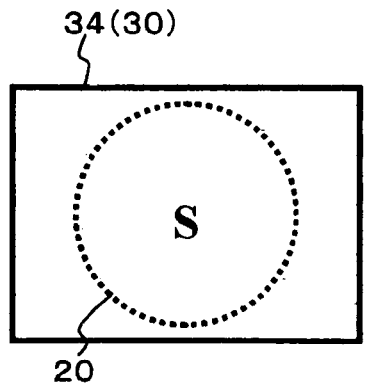
Fig.27-a  Fig.27-b
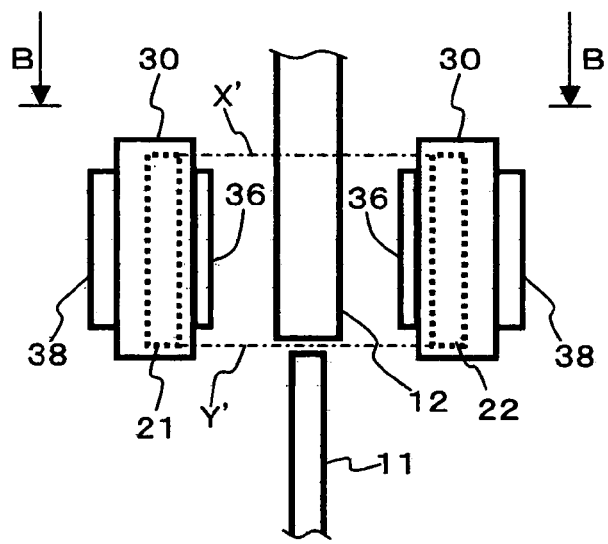 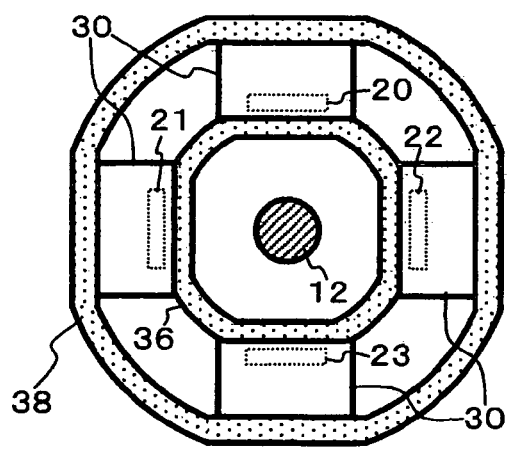
Fig.28-a  Fig.28-b

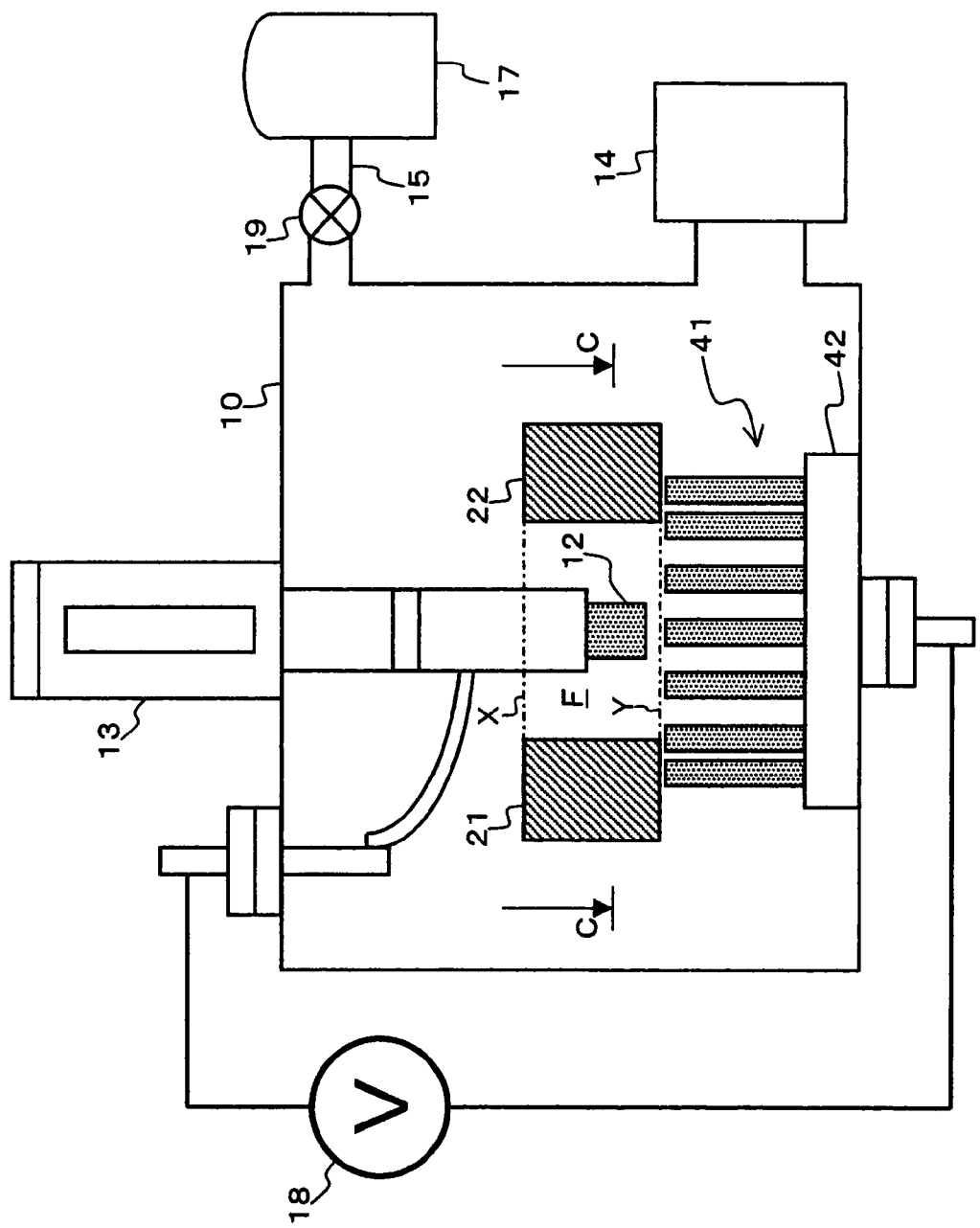

MANUFACTURING APPARATUS AND METHOD FOR CARBON NANOTUBE

This application is a U.S. National Stage Application of International Application No. PCT/JP02/11305 filed Oct. 30, 2002.

TECHNICAL FIELD

The present invention relates to a manufacturing apparatus and method for a carbon nanotube whose industrial availability has been attracting attention in recent years.

BACKGROUND ART

The material having a diameter of 1 µm or smaller which is finer than carbon fibers is generally called carbon nanotubes and distinguished from the carbon fibers. However, there is no particularly definite boundary therebetween. By a narrow definition, the material whose carbon faces with hexagon meshes are substantially parallel to an axis is called a carbon nanotube, and even a variant of the carbon nanotube, around which amorphous carbon exists, is included in the carbon nanotube (Note that the narrow definition is applied to the carbon nanotube according to the present invention.).

Usually, the narrowly-defined carbon nanotubes are further classified into two types: carbon nanotubes having a structure with a single hexagon mesh tube (graphene sheet) are called single wall nanotubes (hereinafter, simply referred to as "SWNT" in some cases); and on the other hand, the carbon nanotubes made of multilayer graphene sheets are called multi-wall nanotubes (hereinafter, simply referred to as "MWNT" in some cases). The carbon nanotubes of these types have an extremely finer diameter than that of the carbon fibers, a high Young's modulus, and high electrical conductivity, thereby attracting attention as a new industrial material.

Thus, the carbon nanotube is a new material whose structural element is only carbon, and is mechanically extremely strong enough to exceed a Young's modulus of 1 TPa. In addition, electrons flowing through the carbon nanotube easily undergo ballistic transport, so that it is possible to flow a large quantity of current. Further, the carbon nanotube has a high aspect ratio, so that its application to a field electron emitting source is underway, and a light emitting element and display having a high brightness is under development. Furthermore, some single wall carbon nanotubes exhibit semiconductor characteristics, and are applied to the experimental manufacture of a diode and a transistor. Therefore, its application is especially desired in a field of functional materials and in a field of an electronic industry.

Conventionally, it has been known that fullerenes and carbon nanotubes can be manufactured by methods including resistance heating, plasma discharge such as arc discharge with a carbon rod as a raw material, laser ablation, and chemical vapor deposition (CVD) using acetylene gas. However, a mechanism of generating carbon nanotubes with those methods is controversial in various respects, and a detailed growth mechanism is not disclosed even now.

With regard to the manufacture of a carbon nanotube, various methods and improvements have been studied for the purpose of synthesis in a large quantity. The resistance heating which was devised in the early stage is a method of heating and vaporizing graphite by bringing the forward ends of two pieces of graphite in contact with each other in a rare gas, and then applying a current of several tens to several hundreds of amperes. However, with this method, it is extremely difficult to obtain a few grams of specimen, so that the method is hardly used now.

The arc discharge is a method of synthesizing fullerenes and carbon nanotubes by generating arc discharge in a rare gas such as He and Ar while using graphite rods as an anode and a cathode. The forward end portion of the anode reaches a high temperature of 4000° C. or more by arc plasma generated by the arc discharge, then the forward end portion of the anode is vaporized, and a large quantity of carbon radicals and neutral particles are generated. The carbon radicals and neutral particles repeat collision in the plasma, further generate carbon radicals and ions, and become soot containing fullerenes and carbon nanotubes to be deposited around the anode and cathodes and on the inner wall of an apparatus. When the anode includes an Ni compound, a ferrous compound, or a rare earth compound, which acts as catalyst, single wall carbon nanotubes are synthesized efficiently.

The laser ablation is a method of irradiating a pulse YAG laser beam on a graphite target, generating high density plasma on the surface of the graphite target, and generating fullerenes and carbon nanotubes. The characteristic of the method is that a carbon nanotube having a relatively high purity can be obtained even at a growth temperature of more than 1000° C.

A technique for higher purity synthesis of the SWNT for the purpose of increasing the purity in the laser ablation is reported in A. Thess et. al, "Nature", Vol. 273, p. 483-487. However, the laser ablation supplies only a small quantity of carbon nanotubes, and the efficiency is low, leading to higher costs of carbon nanotubes. In addition, the purity remains about 70 to 90%, and is not sufficiently high.

The chemical vapor deposition is a method of generating carbon nanotubes by a chemical decomposition reaction of the raw material gas, using an acetylene gas, a methane gas, or the like containing carbon as a raw material. The chemical vapor deposition depends on a chemical reaction occurring in a thermal decomposition process of the methane gas and the like serving as the raw material, thereby enabling the manufacture of a carbon nanotube having a high purity.

However, in the chemical vapor deposition, the growth rate of the carbon nanotube is extremely low, so that the efficiency is low and the industrial application is difficult. In addition, the structure of the manufactured carbon nanotube has more defects and is incomplete compared with that synthesized in the arc discharge or the laser ablation.

The use of a vertical furnace enables continuous growth, thereby realizing a growth apparatus having a high production capability. However, in that case, the purity of the obtained carbon nanotube remains low.

Electrons, ions of carbon, radicals, and neutral particles in the arc plasma generated by the arc discharge repeat recollision, thereby generating complex chemical reactions, so that it is difficult to stably control the density and the kinetic energy of the carbon ions. Thus, a large quantity of amorphous carbon particles and graphite particles are generated simultaneously along with the fullerenes and the carbon nanotubes, all of which exist in a mixed state as soot.

Therefore, when the fullerenes and the carbon nanotubes are to be used for the industrial application, it is necessary to purify and separate only the fullerenes and the carbon nanotubes from the soot. In particular, the carbon nanotubes does not dissolve in a solvent, so that the purification thereof is conducted by combining centrifugation, oxidation, filtering, and the like. However, physical properties and chemical properties of the carbon nanotubes, and those of the amorphous carbon particles and the graphite particles, which are major impurity, are approximately the same, thereby making it difficult to remove the impurity completely. Thus, high purity carbon nanotubes are obtained by repeating purification. It is also known that, in the purification process, alkali metal may remain due to the influence of a surface active agent used as a dispersing agent, and the influence of the mechanical damage is extensive as well in the purification process, thereby causing a large quantity of defects in the carbon nanotubes.

To solve this problem, in the synthesis stage of the carbon nanotubes, a synthesis technique is desired for high purity carbon nanotubes including as less impurities as possible, that is, such carbon nanotubes as to include no amorphous carbon particles nor graphite particles.

Therefore, an object of the present invention is to solve the problems of the above-mentioned conventional art. Specifically, the present invention has an object to provide a manufacturing apparatus and method which can efficiently synthesize a high purity carbon nanotube having an extremely low concentration of impurities such as the amorphous carbon and graphite particles on an industrial basis.

DISCLOSURE OF THE INVENTION

Generally, when discharge plasma is generated in a magnetic field, due to an interaction between the discharge plasma and the magnetic field, charged particles are confined in the magnetic field, thereby increasing an average free path length of the charged particles. Therefore, the probability increases that the charged particles collides with each other or with neutral particles coexisting in the plasma, thereby improving the reaction efficiency.

The present inventors found that by applying this phenomenon to the manufacture of a carbon nanotube, a high purity carbon nanotube can be efficiently provided on an industrial basis, which have an extremely low concentration of impurities such as the amorphous carbon particles and the graphite particles, which leads to the present invention. That is, the present invention provides a manufacturing apparatus for a carbon nanotube, including at least: two electrodes whose forwardmost end portions are opposed to each other; a power supply which applies a voltage between the electrodes in order to generate discharge plasma in a discharge area between the electrodes; and plural magnets that form a magnetic field in the generation area of the discharge plasma by generating a magnetic field from a magnetic pole surface of each of the plural magnets, characterized in that:

the plural magnets are arranged to have the magnetic pole surfaces thereof opposed to one imaginary axis within a space; and of the two electrodes, at least a part of one electrode is located in an area surrounded by: an imaginary plane formed by connecting end portions of the magnetic pole surfaces of the plural magnets on one side in a direction of the imaginary axis; an imaginary plane formed by connecting end portions thereof on the other side; and the magnetic pole surfaces of the plural magnets, and the forwardmost end portion of the other electrode is located in an area outside the area between the two imaginary planes.

According to the manufacturing apparatus for a carbon nanotube according to the present invention, it is possible to efficiently synthesize a high purity carbon nanotube on an industrial basis. It is assumed that this is because the discharge plasma including radicals such as $C^+$, C, and $C_2$, can be confined in a predetermined magnetic field by generating the discharge plasma in the magnetic field, so that the collision probability of the charged particles in the discharge plasma is increased, thereby making it possible to increase the efficiency of generating the carbon nanotube. Also, it is assumed that by locating the two electrodes in such a predetermined position as described above with respect to the magnets, the magnetic flux density of the magnetic field having the vector component appropriate for confining the discharge plasma is greatly increased, thereby further increasing the purity of a carbon nanotube to be manufactured.

At this time, the one electrode is preferably an anode. By arranging the one electrode as the anode, the other electrode to be a cathode is located in the area outside the area between the imaginary plane formed by connecting the end portions of the magnetic pole surfaces of the plural magnets on one side in the direction of the imaginary axis and the imaginary plane formed by connecting the end portions thereof on the other side. Carbon nanotubes grow and are deposited on the cathode, so that the manufactured carbon nanotubes are located in the position outside the area sandwiched between or surrounded by the magnetic pole surfaces of the plural magnets. Therefore, in collecting the manufactured carbon nanotubes or replacing the electrodes, it is unnecessary to take out the other electrode from the area sandwiched between or surrounded by the magnetic pole surfaces of the plural magnets. That is, the manufactured carbon nanotubes can be collected without moving the other electrode, and the electrodes can be replaced by sliding the electrode in a direction perpendicular to the takeout operation. Accordingly, if the carbon nanotubes are located in the position outside the area sandwiched between or surrounded by the magnetic pole surfaces of the plural magnets, it becomes easy to handle the carbon nanotubes, thereby realizing the increase in high productivity for the carbon nanotubes.

In order to replace the electrodes sequentially, there can be given a form in which plural rod-shaped electrodes are provided, the plural rod-shaped electrodes are placed in parallel in a bristling manner, and any one of the rod-shaped electrodes has a forwardmost end portion opposed to the forwardmost end portion of the one electrode and can be moved to a position so as to serve as the other electrode.

Further, it is preferable to provide collecting means for collecting the carbon nanotubes that are manufactured by generating the discharge plasma between the two electrodes and remain adhering to the forwardmost end portion of the other electrode. Examples of the collecting means include the one having a mechanism for scraping off the carbon nanotubes adhering to the forwardmost end portion of the other electrode, and the one having a mechanism for drawing the carbon nanotubes adhering to the forwardmost end portion of the other electrode.

According to the manufacturing apparatus for a carbon nanotube of the present invention, the discharge plasma generated in the discharge area is preferably arc plasma.

According to the manufacturing apparatus for a carbon nanotube of the present invention, arrangements of the plural magnets include a form in which the plural magnets are arranged to surround the one electrode such that all the magnetic pole surfaces of the same poles are opposed to the imaginary axis, and a form in which the even number of magnets, equal to or greater than four, are arranged to surround the one electrode such that each magnetic pole surface opposed to the imaginary axis has a pole alternately opposite to that of the adjacent magnetic pole surface.

According to the manufacturing apparatus for a carbon nanotube of the present invention, of the two electrodes, a magnetic flux density at an edge of the forwardmost end portion of the electrode that generates the discharge plasma is preferably $10^{-5}$ T or more and 1 T or less, and a density of a discharge current at a time of generating the discharge plasma is preferably 0.05 A/mm$^2$ or more and 15 A/mm$^2$ or less with respect to an area of the forwardmost end portion of the electrode that generates the discharge plasma. Also, the voltage applied to the electrodes by the power supply is preferably 1 V or more and 30 V or less.

According to the manufacturing apparatus for a carbon nanotube of the present invention, an area of the forwardmost end portion of a cathode of the two electrodes is preferably equal to or less than the area of the forwardmost end portion of the anode thereof.

According to the manufacturing apparatus for a carbon nanotube of the present invention, at least the discharge area and the two electrodes can be received in a sealed container. In this case, atmosphere adjusting means capable of adjusting an atmosphere inside a sealed container is preferably provided.

According to the manufacturing apparatus for a carbon nanotube of the present invention, the material of the electrodes is preferably carbon or a substance that contains carbon and has an electric resistivity equal to or more than 0.01 Ω·cm and equal to or less than 10 Ω·cm.

On the other hand, a manufacturing method for a carbon nanotube according to the present invention is characterized in that: the above-mentioned manufacturing apparatus for a carbon nanotube of the present invention is used; and by applying a voltage between the two electrodes inside the manufacturing apparatus, discharge plasma is generated in a discharge area between the electrodes to thereby manufacture the carbon nanotube. At this time, a voltage applied between the two electrodes is preferably a DC voltage such that the one electrode of the manufacturing apparatus for a carbon nanotube of the present invention is an anode. Also, the discharge plasma generated in the discharge area is preferably arc plasma.

According to the manufacturing method for a carbon nanotube of the present invention, a pressure of an atmosphere of the discharge area is preferably 0.01 Pa or more and 510 kPa or less, and an atmosphere of the discharge area is preferably a gas atmosphere that contains at least one of gases selected from air, helium, argon, xenon, neon, nitrogen, and hydrogen. Also, an atmosphere of the discharge area preferably further includes a gas that is composed of a substance containing carbon.

BRIEF DESCRIPTION OF THE DRAWINGS

FIG. 27-a is a schematic cross sectional view showing an example of cooling means formed by attaching a heat releasing member to the permanent magnet;

FIG. 27-b is a front view observed from the right (the side of a surface which is opposed to the above-mentioned imaginary axis) of FIG. 27-a;

FIG. 28-a is a cross sectional view of the permanent magnets and a periphery of the electrode taken along a direction of side surfaces thereof, which shows an example of the cooling means formed by attaching the heat releasing member to each permanent magnet and further subjecting this to water cooling;

FIG. 28-*b* is a cross sectional view taken along a line B-B of FIG. 28-*a*;

FIG. 29 is a schematic cross sectional view showing a manufacturing apparatus for a carbon nanotube according to Embodiment Mode 2 of the present invention;

BEST MODES FOR CARRYING OUT THE INVENTION

Hereinafter, the present invention will be described in detail citing preferred embodiment modes.

Embodiment Mode 1

Figure 1:
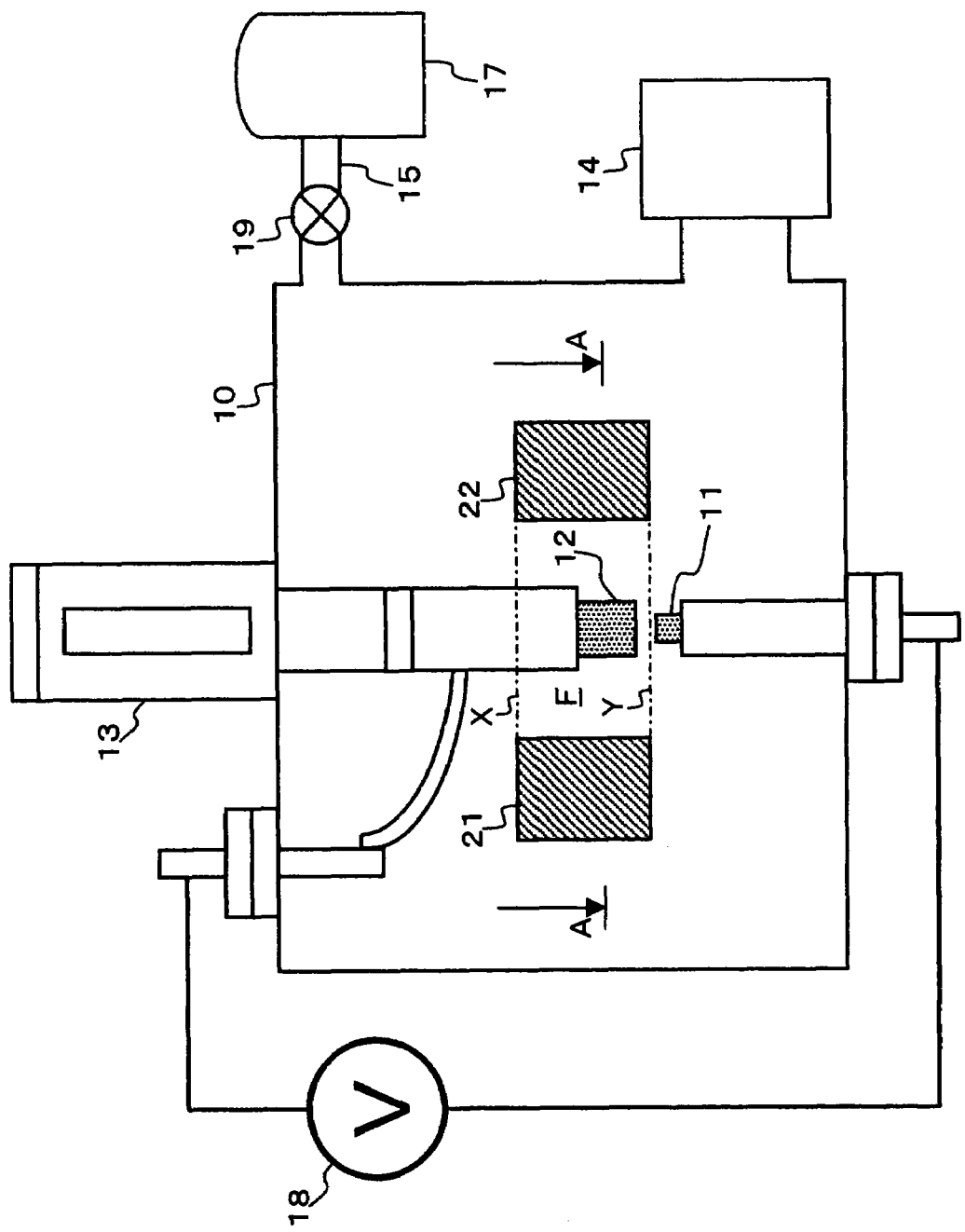
FIG. 1 is a schematic cross sectional view showing a manufacturing apparatus for a carbon nanotube according to Embodiment Mode 1 of the present invention.
Figure 2:
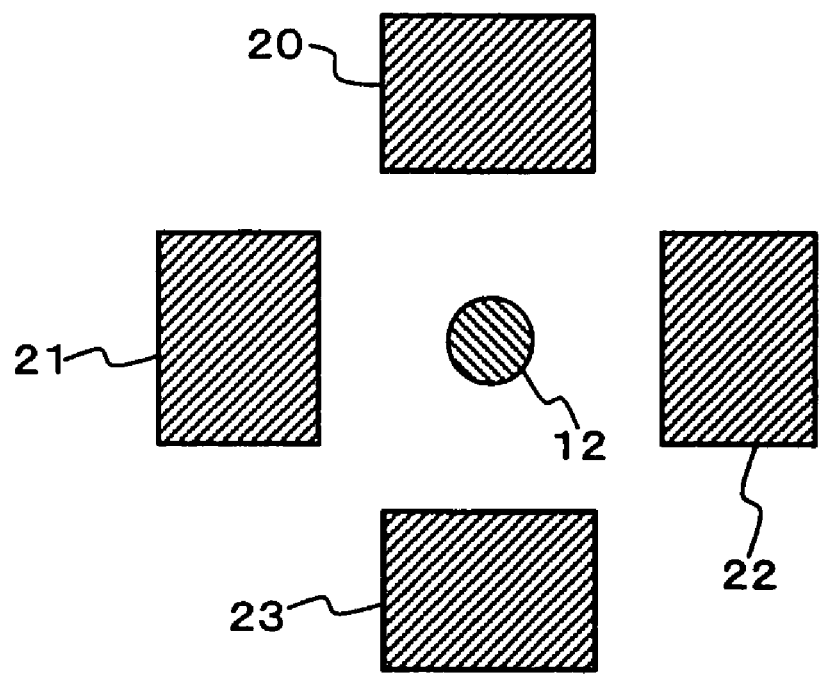
FIG. 2 is a cross sectional view (cross sectional view of only permanent magnets and an electrode) taken along a line A-A of FIG. 1.

FIG. 1 is a schematic cross sectional view showing a manufacturing apparatus for a carbon nanotube according to Embodiment Mode 1 of the present invention, and FIG. 2 is a schematic cross sectional view (cross sectional view of only permanent magnets and an electrode) taken along a line A-A of FIG. 1. The carbon nanotube manufacturing apparatus according to this embodiment mode shown in FIGS. 1 and 2 is structured by arranging permanent magnets 20 to 23 in addition to a conventional carbon nanotube manufacturing apparatus using discharge plasma. The conventional carbon nanotube manufacturing apparatus is composed of: two electrodes (an electrode 12 on one side serving as an anode, and an electrode 11 on the other side serving as a cathode) having forwardmost end portions opposed to each other, which are disposed inside a reaction container (chamber) 10 used as a sealed container; a moving apparatus 13 that can slide the electrode 12 in a manner capable of adjusting the interval between the electrode 11 and the electrode 12; a power supply 18 for applying a voltage between the electrode 11 and the electrode 12; a vacuum pump 14 capable of decompressing the atmosphere in the reaction container 10; a gas cylinder 17 for storing a desired gas; an inlet tube 15 interconnecting between the gas cylinder 17 and the reaction container 10; and atmosphere adjusting unit including a valve 19 capable of changing over the interconnection between opened and closed states. That is, a predetermined magnetic field is generated by the permanent magnets 20 to 23 in a discharge area between the electrode 11 and the electrode 12 in which the discharge plasma is generated when a voltage is applied between the electrode 11 and the electrode 12.

The permanent magnets 20 to 23 are arranged to surround the electrode 12. Here, the permanent magnets 20 to 23 are arranged such that their magnetic pole surfaces (in the present invention, the term "magnetic pole surface" refers to a magnet surface that has the S or N pole and generates a magnetic field) are opposed to the electrode 12.

Also, an area F is surrounded by: an imaginary plane X formed by connecting end portions of the magnetic pole surfaces of the permanent magnets 20 to 23 on one side in an axial direction of the electrode 12; an imaginary plane Y formed by connecting end portions thereof on the other side; and the magnetic pole surfaces of the permanent magnets 20 to 23. The electrode 12 is located in the area F, and the forwardmost end portion of the electrode 11 is located in an area outside the area F.

Thus, by generating the discharge plasma between the electrode 11 and the electrode 12 in the predetermined magnetic field formed by the permanent magnets 20 to 23, the discharge plasma including radicals such as $C^+$, C, and $C_2$ are confined in the magnetic field. Therefore, it is assumed that the collision probability of charged particles in the discharge plasma is improved, thereby making it possible to increase the efficiency of generating the carbon nanotube. As a result, according to this embodiment mode, it is possible to reduce inclusion of the amorphous carbon and graphite particles which result in the impurities.

Also, in this embodiment mode, a discharge area between the electrode 11 and the electrode 12 is adjusted so as to be located in a position displaced from a center position of the area surrounded by the permanent magnets 20 to 23 (intermediate position between the imaginary plane X and the imaginary plane Y along the axis of the electrode 12). At the center position of the area surrounded by the permanent magnets 20 to 23, the direction of the formed magnetic field is, in most cases, orthogonal to the axial direction of the electrode 12, or the magnetic field is hardly formed since components of the magnetic field are canceled out. When the generation area is displaced from the center position, the intensity of the magnetic field is increased, or the magnetic flux density of the magnetic field having the vector component effective for confining the discharge plasma is further increased. Therefore, it is assumed that the displacement of the center position as in this embodiment mode further increases the purity of the carbon nanotube to be manufactured.

Here, a description will be made of the arrangement of the respective magnets and respective electrodes of the present invention.

According to the present invention, the number of magnets is not limited to four as in this embodiment mode, but may be two or more. However, as in this embodiment mode, such an arrangement as to surround the one electrode (electrode 12) is effective for confining the discharge plasma, so that the number of magnets is preferably three or more. Naturally, even in the case of using two magnets, the magnets each having an arc shape can be arranged to surround the one electrode, which is a preferable form as well. There is no limit to the number of magnets.

According to the present invention, the plural magnets may be arranged such that their respective magnetic pole surfaces are opposed to one imaginary axis in a space. In this embodiment mode, the imaginary axis coincides with the axis of the one electrode (that is, the magnetic pole surfaces of the permanent magnets 20 to 23 are opposed to the electrode 12). However, the coincidence thereof is not always necessary. Naturally, the coincidence of the two axes is effective for confining the discharge plasma, so that the purity of the carbon nanotube to be manufactured is further increased, which is preferable.

FIGS. 3 to 10 show examples of the arrangement of the magnets. In each of the drawings, a black dot at the center indicates the imaginary axis disposed perpendicularly to the paper with the drawing thereon, and areas hatched with oblique lines indicate the magnets. The magnets each have one magnetic pole surface opposed to the black dot and another magnetic pole surface as the back surface thereof.

Figure 3:
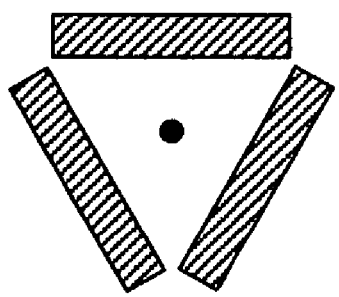
FIG. 3 is a plan view showing an example of an arrangement of magnets.
Figure 4:
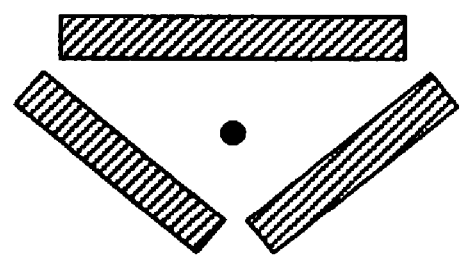
FIG. 4 is a plan view showing an example of the arrangement of magnets.

FIGS. 3 and 4 show forms in which three magnets each having a planar shape are arranged to enclose a space. In this case, the imaginary axis is located in the position surrounded by the three magnets. In the example shown in FIG. 3, the three magnets each have the same length and form an equilateral triangle (as an area formed by the magnetic pole surfaces). However, as in the example shown in FIG. 4, the three magnets may have different lengths or form a triangular shape other than the equilateral triangle.

Figure 5:
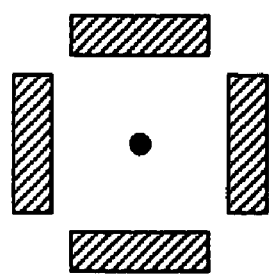
FIG. 5 is a plan view showing an example of the arrangement of magnets.
Figure 6:
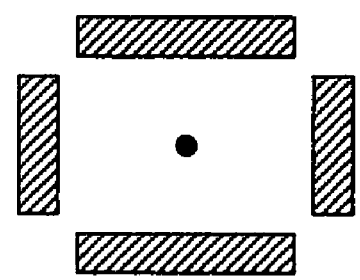
FIG. 6 is a plan view showing an example of the arrangement of magnets.

FIGS. 5 and 6 show forms in which four magnets each having a planar shape are arranged to enclose a space. In this case, the imaginary axis is located in the position surrounded by the four magnets. In the example shown in FIG. 5, the four magnets each have the same length and form a square (as an area formed by the magnetic pole surfaces). However, as in the example shown in FIG. 6, the four magnets may have different lengths or form a quadrangular shape other than the square.

Figure 7:
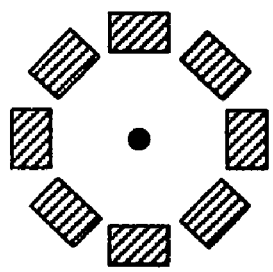
FIG. 7 is a plan view showing an example of the arrangement of magnets.
Figure 8:
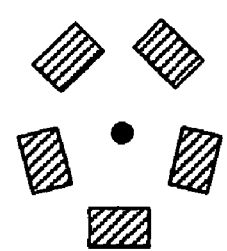
FIG. 8 is a plan view showing an example of the arrangement of magnets.

The number of magnets may be two or any number more than two. Naturally, the three or four magnets shown in FIGS. 3 to 6 may be changed into five magnets or more. FIG. 7 shows a form in which eight magnets each having a planar shape are arranged to enclose a space. In this case, the imaginary axis is located in the position surrounded by the eight magnets. In the example shown in FIG. 7, the eight magnets each have the same length and form a regular polygon (as an area formed by the magnetic pole surfaces). However, the eight magnets may form a polygon with five vertices or more other than the regular polygon. That is, naturally as in the form of FIG. 8, five magnets each having a planar shape may be arranged to enclose a space and form a pentagon having a somewhat flat shape.

Figure 9:
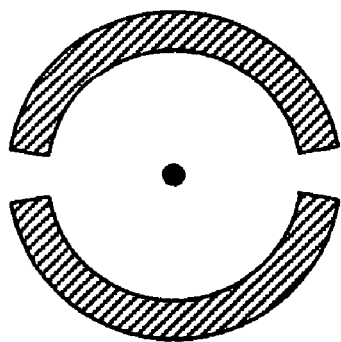
FIG. 9 is a plan view showing an example of the arrangement of magnets.
Figure 10:
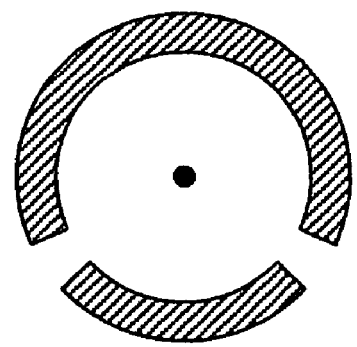
FIG. 10 is a plan view showing an example of the arrangement of magnets.

FIGS. 9 and 10 show forms in which two magnets each having an arc shape are arranged to opposed to each other. In this case, the imaginary axis is located in the position sandwiched between the arc-shaped magnets opposed to each other. In the example shown in FIG. 9, the two magnets each have the same arc length. However, as in the example shown in FIG. 10, the two magnets may have different arc lengths.

Of the arrangements of the magnets exemplified above, the arrangements are preferable in which the magnets surround the imaginary axis as in the examples of FIGS. 3 to 10.

Some examples of the arrangements of the magnets have been given hereinabove. However, according to the present invention, the arrangement of the magnets is not limited to the above examples.

The magnets are arranged such that one of the magnetic pole surfaces of each magnet is opposed to the imaginary axis. At this time, one of the magnetic pole surfaces having the S pole and the magnetic pole surface having the N pole maybe opposed to the imaginary axis. FIGS. 13 to 18 show examples of the directions of the magnetic pole surfaces. In each of the drawings, a black dot at the center indicates the imaginary axis disposed perpendicularly to the paper with the drawing thereon, areas hatched with oblique lines indicate the S poles, and hollow areas indicate the N poles. The plane (or curved surface) on each side thereof indicates the magnetic pole surface of the corresponding pole.

Figure 11:
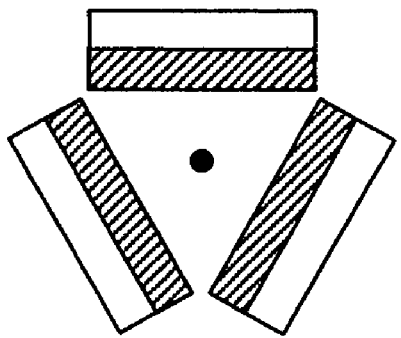
FIG. 11 is a plan view showing an example of the arrangement of magnets and directions of magnetic poles.
Figure 12:
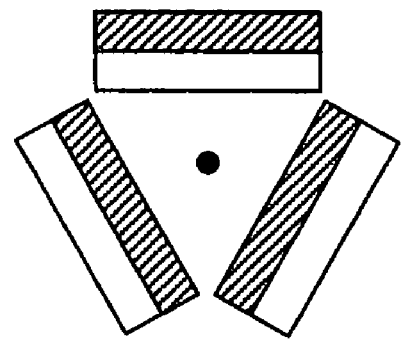
FIG. 12 is a plan view showing an example of the arrangement of magnets and the directions of magnetic poles.

FIGS. 11 and 12 show the examples of the directions of the magnetic pole surfaces in the arrangements of FIG. 3. In FIG. 11, all the three magnets have the S poles directed toward the imaginary axis, while in FIG. 12, two S poles and one N pole are directed toward the imaginary axis. Alternatively, although not shown, all the three magnets may have the N poles directed toward the imaginary axis. Further, although not shown, one S pole and two N poles may be directed toward the imaginary axis.

Figure 13:
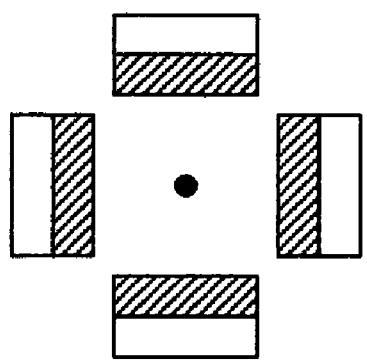
FIG. 13 is a plan view showing an example of the arrangement of magnets and the directions of magnetic poles.
Figure 14:
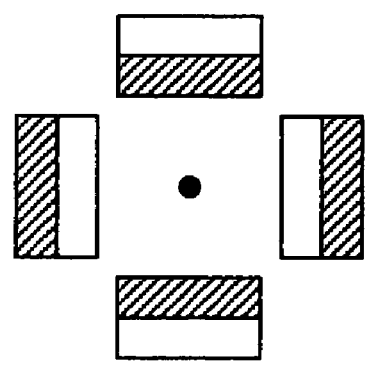
FIG. 14 is a plan view showing an example of the arrangement of magnets and the directions of magnetic poles.

FIGS. 13 and 14 show the examples of the directions of the magnetic pole surfaces in the arrangements of FIG. 5. In FIG. 13, all the four magnets have the S poles directed toward the imaginary axis, while in FIG. 14, two S poles and two N poles are directed toward the imaginary axis such that each magnetic pole surface opposed to the imaginary axis has a pole alternately opposite to that of the adjacent magnetic pole surface. Alternatively, although not shown, all the four magnets may have the N poles directed toward the imaginary axis.

Figure 15:
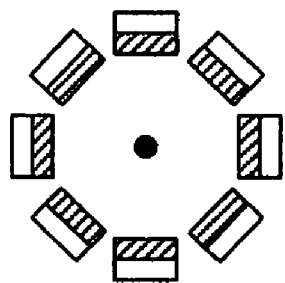
FIG. 15 is a plan view showing an example of the arrangement of magnets and the directions of magnetic poles.
Figure 16:
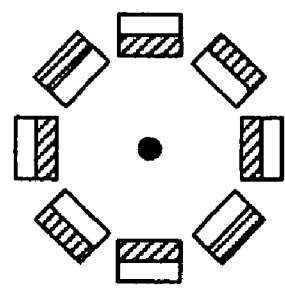
FIG. 16 is a plan view showing an example of the arrangement of magnets and the directions of magnetic poles.

FIGS. 15 and 16 show the examples of the directions of the magnetic pole surfaces in the arrangements of FIG. 7. In FIG. 15, all the eight magnets have the S poles directed toward the imaginary axis, while in FIG. 16, four S poles and four N poles are directed toward the imaginary axis such that each magnetic pole surface opposed to the imaginary axis has a pole alternately opposite to that of the adjacent magnetic pole surface. Alternatively, although not shown, all the eight magnets may have the N poles directed toward the imaginary axis.

Figure 17:
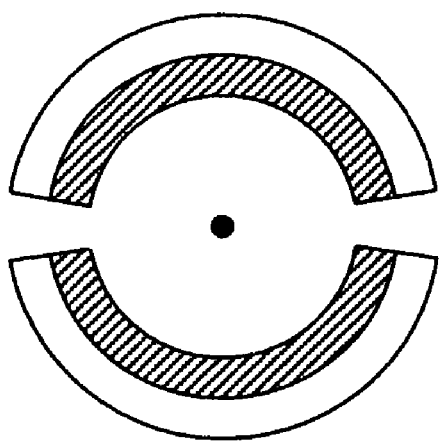
FIG. 17 is a plan view showing an example of the arrangement of magnets and the directions of magnetic poles.
Figure 18:
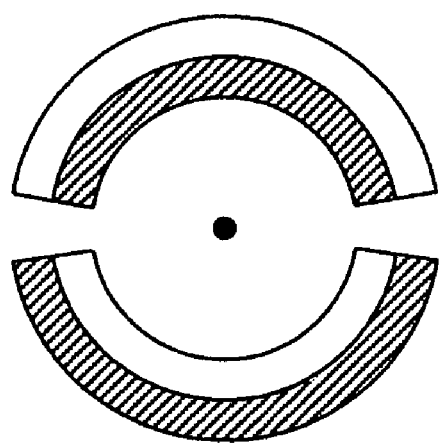
FIG. 18 is a plan view showing an example of the arrangement of magnets and the directions of magnetic poles.

FIGS. 17 and 18 show the examples of the directions of the magnetic pole surfaces in the arrangements of FIG. 9. In FIG. 17, both the two magnets have the S poles directed toward the imaginary axis, while in FIG. 18, one of the magnets has the S pole directed toward the imaginary axis and the other has the N pole directed toward the imaginary axis. Alternatively, although not shown, both the two magnets may have the N poles directed toward the imaginary axis.

Among the above examples of the directions of the magnetic pole surfaces given by FIGS. 13 to 18, one of the following two structures are effective for confining the discharge plasma:

(A) a structure as exemplified in FIGS. 11, 13, 15, and 17, in which the plural magnets are arranged to surround the imaginary axis (that is, the one electrode) such that all the magnetic pole surfaces of the same poles are opposed to the imaginary axis; and (B) a structure as exemplified in FIGS. 14 and 16, in which the even number of magnets, equal to or greater than four, are arranged to surround the one electrode such that each magnetic pole surface opposed to the imaginary axis has a pole alternately opposite to that of the adjacent magnetic pole surface. Accordingly, the purity of the carbon nanotube to be manufactured is further increased, which is preferable.

Figure 19:
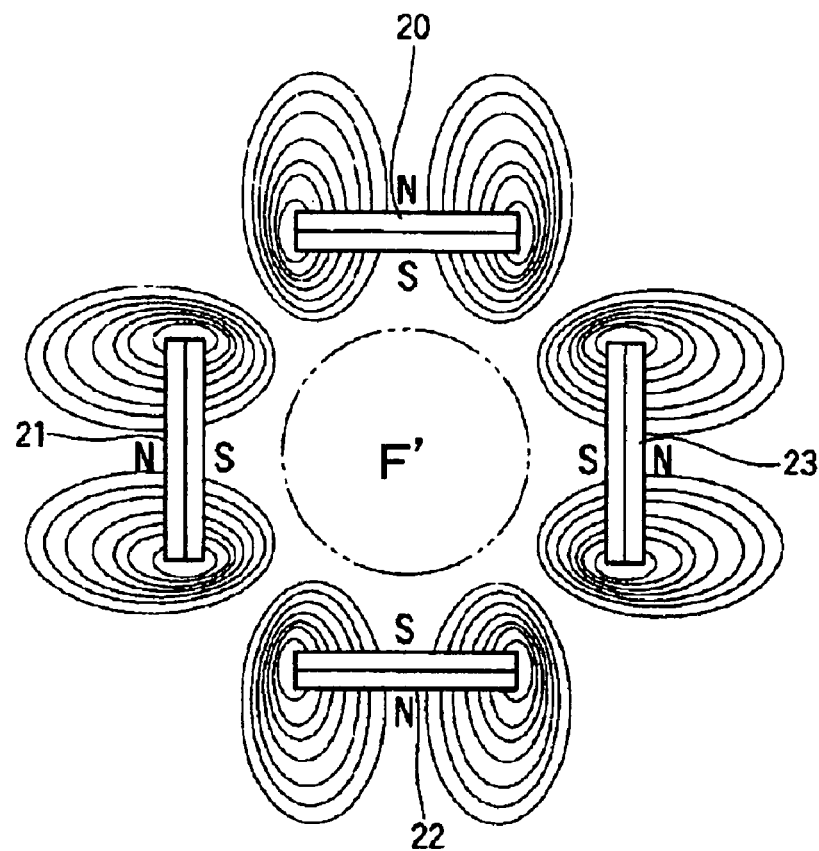
FIG. 19 is a schematic view showing a state of lines of magnetic force in the case where the permanent magnets are arranged such that all the magnetic pole surfaces of the same poles are opposed to an imaginary axis in the manufacturing apparatus of FIG. 1.
Figure 20:
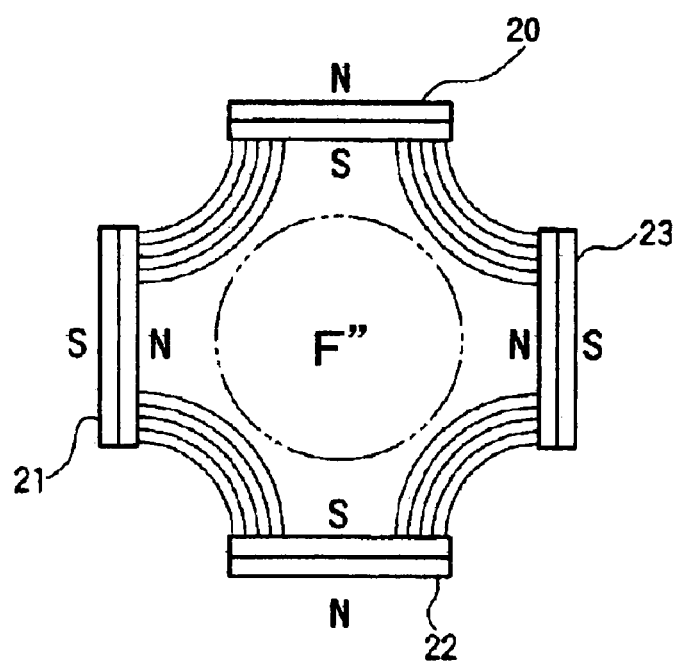
FIG. 20 is a schematic view showing a state of lines of magnetic force in the case where the permanent magnets are arranged such that each magnetic pole surface opposed to the imaginary axis has the N or S pole alternately opposite to that of the adjacent magnetic pole surface in the manufacturing apparatus of FIG. 1.

According to this embodiment mode shown in FIGS. 1 and 2, a description will be made of a state of the magnetic field in the case where the magnetic pole surfaces have the directions described in the above respective structures (A) and (B). FIG. 19 is a schematic view showing a state of lines of magnetic force in the above structure (A), that is, in the case where the permanent magnets 20 to 23 are arranged such that all the magnetic pole surfaces of the same poles are opposed to the imaginary axis. FIG. 20 is a schematic view showing a state of lines of magnetic force in the above structure (B), that is, in the case where the permanent magnets 20 to 23 are arranged such that each magnetic pole surface opposed to the imaginary axis has the N or S pole alternately opposite to that of the adjacent magnetic pole surface.

In the structure of FIG. 19, the lines of magnetic force emitted from the respective permanent magnets 20 to 23 toward the discharge area are repulsive to each other, and an area indicated by F' becomes a state surrounded by the multi-directional lines of magnetic force.

In the structure of FIG. 20, the lines of magnetic force emitted from the respective permanent magnets 20 to 23 toward the discharge area converge on the adjacent permanent magnets, and an area indicated by F" becomes a state surrounded by the multi-directional lines of magnetic force.

As described above, according to the forms shown in FIGS. 19 and 20, multi-directional magnetic fields are acted on the area indicated by F' or F". Thus, if the discharge plasma is generated in the area F' or F", it is assumed that the motion of the charged particles in the discharge plasma is restricted in the space between the electrode 11 and the electrode 12. If the carbon nanotube is thus manufactured, it is possible to efficiently synthesize a high purity carbon nanotube having a low impurity concentration at low costs on an industrial basis.

Figure 21:
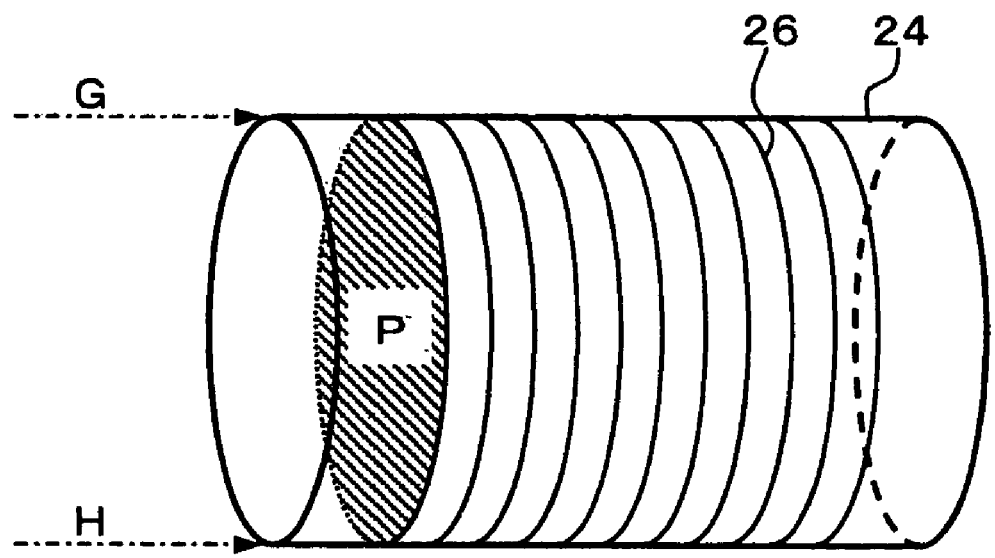
FIG. 21 is a perspective view showing an example of an electromagnet applicable to the present invention as a magnet.
Figure 22:
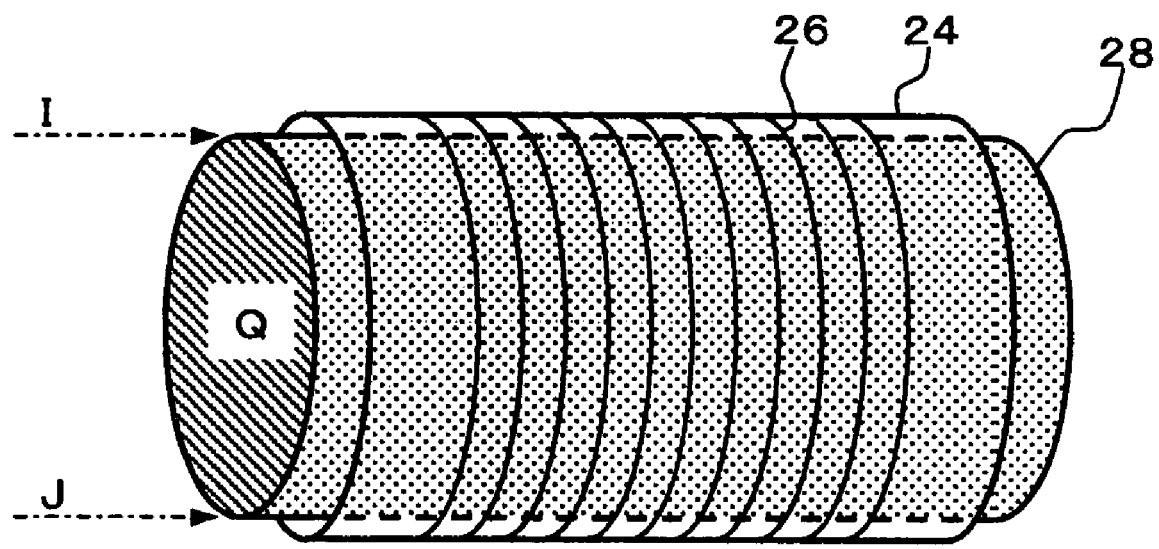
FIG. 22 is a perspective view showing another example of the electromagnet applicable to the present invention as a magnet.

Note that in this embodiment mode, the permanent magnets 20 to 23 are used as the magnets. However, according to the present invention, the magnets are not limited to the permanent magnets, and may be electromagnets that are each formed into a simple coil shape or formed by adding a magnetic core thereto. FIG. 21 is a perspective view showing an example of the electromagnet having a simple coil shape. FIG. 22 is a perspective view showing another example of the electromagnet formed by adding a magnetic core inside the coil.

In FIG. 21, reference numeral 24 denotes a cylindrical body formed of a non-magnetic substance, and an electromagnet is structured by winding a coil 26 around the cylindrical body 24. On the other hand, in FIG. 22, a magnetic core 28 is fitted and inserted to the inside of the cylindrical body 24. From the viewpoint of increasing the magnetic flux density, the form shown in FIG. 22 with the magnetic core 28 fitted and inserted is preferable, and may naturally be the form of FIG. 21.

In the electromagnet shown in FIG. 21, lines of magnetic force penetrates the electromagnet in the vertical direction in the drawing, so that disc-like surfaces formed by the coil 26 at both the left and right ends are magnetic pole surfaces, that is, surfaces that generate lines of magnetic force of the N pole and the S pole. The existence of the cylindrical body 24 does not affect the discussion on the magnetic pole surfaces at all. If the left side in FIG. 21 is typified, a plane P is the magnetic pole surface. Therefore, in the magnet in this case, the magnetic pole surface is not formed to be a physical surface, but is structured by being formed imaginarily in a space.

On the other hand, in the electromagnet shown in FIG. 22, both the left and right surfaces of the magnetic core 28 in the drawing are the magnetic pole surfaces, that is, the surfaces that generate lines of magnetic force of the N pole and the S pole. If the left side in FIG. 21 is typified, a plane Q is the magnetic pole surface.

According to the present invention, the two electrodes are arranged on the premise that the forwardmost ends thereof are opposed to each other in order to generate discharge plasma, and that a magnetic field is generated in the generation area of the discharge plasma between both the electrodes by a magnetic field generated from the magnetic pole surfaces of the plural magnets (in other words, that the generation area of the discharge plasma between both the electrodes is in the position on which the magnetic field due to the plural magnets effects). Further, the two electrodes are arranged on the essential condition that, of the two electrodes, at least a part of one electrode is located in an area surrounded by: an imaginary plane formed by connecting end portions of the magnetic pole surfaces of the plural magnets on one side in a direction of the imaginary axis; an imaginary plane formed by connecting end portions thereof on the other side; and the magnetic pole surfaces of the plural magnets, and the forwardmost end portion of the other electrode is located in an area outside the area surrounded by the two imaginary planes and the magnetic pole surfaces.

If FIG. 1 is used for explanation, according to the present invention, the imaginary axis coincides with the electrode 12, so that the two imaginary planes correspond to the imaginary plane X formed by connecting upper ends of the permanent magnets 20 to 23 in the axial direction of the electrode 12 in the drawing, and the imaginary plane Y formed by similarly connecting lower ends thereof in the drawing. The two electrodes 11 and 12 are arranged based on the area F surrounded by those two imaginary planes X and Y and the permanent magnets 20 to 23 as a reference.

Note that regarding the "end portions in the imaginary axis direction" in the case of using the electromagnet as a magnet, the end portions of the electromagnet having no magnetic core as shown in FIG. 21 are determined based on the coil composing a main portion of the electromagnet as a reference. If the example of FIG. 21 is used for explanation and the vertical direction in the drawing is assumed to be the imaginary axis direction, the positions indicated by the arrows G and H are the "end portions in the imaginary axis direction". Note that in FIG. 21, the cylindrical body 24 and the coil 26 have no thicknesses for the convenience of preparing the drawing. However, strictly speaking, those positions to be both end portions have no relationship with the cylindrical body 24, and fall on the center of the lead wire of the coil 26 (innermost lead wire thereof when wound around twice or more).

On the other hand, the end portions of the electromagnet having a magnetic core as shown in FIG. 22 are determined based on the magnetic core as a reference because the end portions of the magnetic core themselves are the magnetic pole surfaces. If the example of FIG. 22 is used for explanation and the vertical direction in the drawing is assumed to be the imaginary axis direction, the positions indicated by the arrows I and J are the "end portions in the imaginary axis direction".

According to the present invention, of the two electrodes, at least a part of the one electrode (electrode 12 in this embodiment mode) is located in the area F, and the forwardmost end portion of the other electrode (electrode 11 in this embodiment mode) is located in the area outside the area F.

Figure 23:
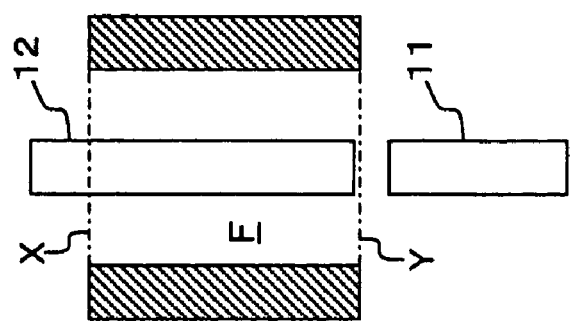
FIG. 23 is a schematic cross sectional view showing an arrangement of electrodes in the manufacturing apparatus of FIG. 1.

FIGS. 23 to 26 show examples of forms of the electrode arrangement applicable to the present invention. The form of FIG. 23 represents the form of this embodiment mode, and the others correspond to modified examples of this embodiment mode. In FIGS. 1 and 23, the forwardmost end portion of the electrode 12 is located in the area F, and the forwardmost end portion of the electrode 11 is located outside the area F so as to be opposed to the electrode 12.

Figure 26:
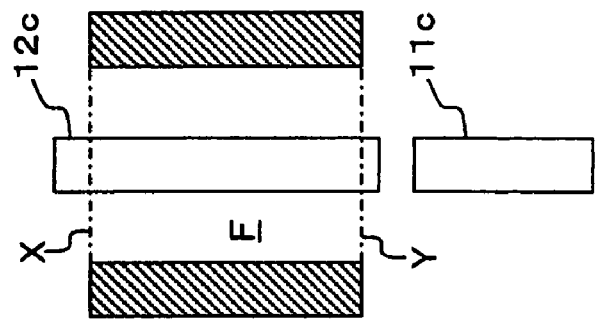
FIG. 26 is a schematic cross sectional view showing further another example of the arrangement of electrodes which can be adopted in the present invention.
Figure 25:
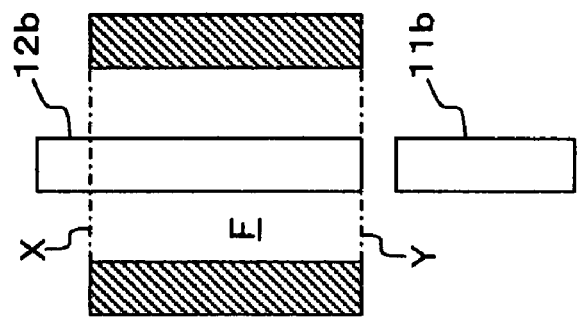
FIG. 25 is a schematic cross sectional view showing another example of the arrangement of electrodes which can be adopted in the present invention.
Figure 24:
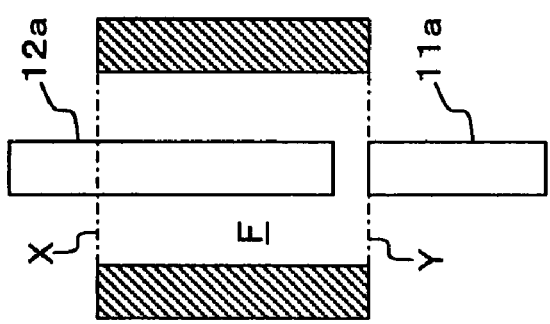
FIG. 24 is a schematic cross sectional view showing an example of an arrangement of electrodes which can be adopted in the present invention.

To the contrary, the forms in which the electrodes are slid in the imaginary axis (axis of the electrode 12) direction correspond to the modified examples of FIGS. 24 to 26.

In FIG. 24, the forwardmost end portion of an electrode 12a is located in the area F, and an electrode 11a is located so as to be opposed to the electrode 12a in the state where the imaginary plane X defining the area F coincides with the forwardmost end portion of the electrode 11a. Thus, according to the present invention, the state where the electrode 11a corresponding to "the other electrode" contacts the area F is also included in the case of "being located in the area outside the area surrounded by the two imaginary planes and the magnetic pole surfaces". In other words, the expression "outside the area" represents the concept including a boundary line of the area.

In FIG. 25, the imaginary plane X and the forwardmost end portion of an electrode 12b are located so as to coincide with each other, and the forward most end portion of an electrode 11b is located outside the area F so as to be opposed to the electrode 12b. Further, in FIG. 26, an electrode 12c penetrates the area F with its forwardmost end portion located outside the area F, and the forwardmost end portion of an electrode 11c is naturally located outside the area F so as to be opposed to the electrode 12c. Thus, according to the present invention, even if the forwardmost end portions of the electrodes 12b and 12c each corresponding to "the one electrode" are located outside the area F, there is no problem as long as at least a part of each of the electrodes is included in the area F.

It is assumed that by arranging the two electrodes as described above, the magnetic flux density of the magnetic field having the vector component appropriate for confining the discharge plasma in a magnetic field is greatly increased, thereby further increasing the purity of a carbon nanotube to be manufactured. Also, if the "electrode at least a part of which is located in the area F" corresponding to "the one electrode" is arranged to be the electrode 12 as in this embodiment mode, the carbon nanotubes grow and are deposited on the end portion of the electrode 11 corresponding to "the other electrode", so that the manufactured carbon nanotubes are located in the position outside the area surrounded by the magnetic pole surfaces of the permanent magnets 20 to 23. Therefore, in collecting the manufactured carbon nanotubes or replacing the electrodes 11, it is unnecessary to take out the electrode 11 from the area surrounded by the magnetic pole surfaces of the permanent magnets 20 to 23. That is, without moving the electrode 11, the manufactured carbon nanotubes can be collected (for example, by scraping off using a spatula or drawing using a suction apparatus), and by sliding the electrode 11 in a direction perpendicular to the takeout operation (in the vertical direction of FIG. 1), the electrodes 11 can be replaced. Accordingly, if the carbon nanotubes are located in the position outside the area surrounded by the magnetic pole surfaces of the permanent magnets 20 to 23, it becomes easy to handle the carbon nanotubes, thereby realizing the increase in high productivity for the carbon nanotubes.

The range of length of gaps between both the forward end portions of the electrodes 11 (a to c) and the forward end portions of the electrodes 12(a to c), respectively, is selected from the range enough to generate the discharge plasma, and determined by itself based on the voltage drop. Generally, the range is selected from the range approximately between 0.1 to 5 mm.

Also, there is a condition that the generation areas of the discharge plasma between the electrodes 11 (a to c) and the electrodes 12 (a to c), respectively, are in the position on which the magnetic field due to the permanent magnets 20 to 23 effects, so that the distance between the electrodes 12 (a to c) and the imaginary plane Y is also determined by itself based on the magnetic force and the like of the permanent magnets 20 to 23. Specifically, it is preferable to set the distance within such a range as to satisfy "the magnetic flux density in the discharge area" described later.

Next, a description will be made of examples of manufacturing a carbon nanotube by using the manufacturing apparatus for a carbon nanotube of this embodiment mode.

A reaction container (chamber) 10 is a sealed container in a cylindrical shape (disposed such that both the bottom surfaces face upward and downward respectively in the drawing), and the container is desirably made of metal, especially stainless steel, and may be suitably made of an aluminum alloy, quartz, and the like. Additionally, the shape is not limited to the cylindrical shape, and a desired shape such as a box shape may be used. Further, in the case where the atmosphere of the discharge area is an atmosphere of air at an atmospheric pressure and the carbon nanotubes are to be adhered around the forwardmost end portion of the electrode 11, the reaction container 10 is not indispensable, or the reaction container 10 is not necessarily a sealed container.

The two electrodes 11 and 12 whose forwardmost end portions are opposed to each other are disposed in the reaction container 10. At this time, when the material of the reaction container 10 is the one having electric conductivity such as metal, the reaction container 10 and the electrode 11 and electrode 12 are fixed while they are electrically insulated from each other. Note that as the arrangement of the two electrodes 11 and 12, in addition to the state as shown in FIG. 1 in which both the axes coincide with each other so as to be opposed to each other completely, the state may be possible in which the axes of the two electrodes 11 and 12 have a certain angle and the forwardmost end portions are made close to each other. In the present invention, the expression "the forwardmost end portions are opposed to each other", represents the concept including the latter case described above. Naturally, the former form as shown in FIG. 1 is desirable.

As to the arrangement of the electrodes 11 and 12, when the opposing surfaces of the electrode 11 and the electrode 12 are arranged in parallel, the stable discharge such as arc discharge can be realized, and the carbon nanotubes can be synthesized efficiently.

Carbon is desirable as the material of the two electrodes 11 and 12, but a substance that contains carbon and has an electric resistivity of 0.01 Ω·cm or more and 10 Ω·cm or less (preferably 0.01 Ω·cm or more and 1 Ω·cm or less) is suitably used.

The shape of the two electrodes 11 and 12 are not limited, and examples of the shape may include a cylindrical shape, a rectangular column shape, and a truncated cone shape, but the cylindrical shape is desirable. In addition, the diameter of the forwardmost end portion (in the case where the forward most end portion is not circular, the diameter of a circle having the same area as the forwardmost end portion) of the two electrodes 11 and 12 is not especially limited, but preferably 1 mm or more and 100 mm or less.

As to the opposing two electrodes 11 and 12, the area of the forwardmost end portion of the electrode 11 serving as the cathode is desirably equal to or less than the area of the forwardmost end portion of the electrode 12 serving as the anode. The purity of the obtained carbon nanotube is further increased when the area of the forwardmost end portion of the cathode is equal to or less than the area of the forwardmost end portion of the anode. The ratio of the areas between them (the area of the forwardmost end portion of the cathode/the area of the forwardmost end portion of the anode) is preferably 0.1 to 0.9, and more preferably 0.2 to 0.5.

In order to stabilize the discharge, it is preferable that the electrodes 11 and 12 are cooled with water to thereby suppress the increase in temperature of the electrodes. If the electrodes 11 and 12 are to be cooled with water, it is desirable to use the metal high in heat conductivity, in particular copper, for supporting portions for the electrodes 11 and 12.

By using atmosphere adjusting means including a vacuum pump 14, a gas cylinder 17, an inlet tube 15, and a valve 19 to appropriately adjust the atmosphere inside the reaction container 10, the atmosphere in the discharge area is set to a desired state. Specifically, the vacuum pump 14 can decompress or compress the inside of the reaction container 10. After the inside of the reaction container 10 is decompressed by the vacuum pump 14, the valve 19 is opened, and a desired gas stored in the gas cylinder 17 is introduced into the reaction container 10 through the inlet tube 15, thereby making it possible to obtain the desired gas atmosphere. Naturally, the operation for adjusting the atmosphere is unnecessary when the atmosphere is the atmosphere of air at the atmospheric pressure.

Examples of the vacuum pump 14 include a rotary pump, a diffusion pump, and a turbo molecule pump.

The pressure of the atmosphere inside the reaction container 10 (that is, atmosphere in the discharge area, used in the same sense hereinafter) may be 0.01 Pa or more and 510 kPa or less, preferably 0.1 Pa or more and 105 kPa or less, and more preferably 13 Pa or more and 70 kPa or less. Under such a pressure, high purity carbon nanotubes can be manufactured.

The atmospheric gas in the reaction container 10 is not specifically limited, and air, helium, argon, xenon, neon, nitrogen, hydrogen, and mixture of those gases are desirable. In the case of introducing a desired gas, after the inside of the reaction container 10 is exhausted by the vacuum pump 14, the desired gas is introduced up to a predetermined pressure from the gas cylinder 17.

According to the present invention, the atmosphere inside the reaction container 10 can further store a gas including a substance containing carbon. In this case, the atmosphere may only include the gas including the substance containing carbon, or the gas including the substance containing carbon may be introduced into the atmosphere of the different types of gases described above. By adding the gas including the substance containing carbon to the atmosphere, it is possible to manufacture a carbon nanotube having an anomalous structure. This carbon nanotube has a structure of carbon grown around a carbon nanotube as a center axis.

The applicable substance containing carbon is not limited, and hydrocarbons such as ethane, methane, propane, and hexane; alcohols such as ethanol, methanol, and propanol; ketones such as acetone; petroleums; gasolines; inorganic substances such as carbon monoxide, and carbon dioxide; or the like, can be used. Acetone, ethanol, and hexane are especially preferable.

In the manufacturing apparatus for a carbon nanotube according to this embodiment mode on which the conditions described above are set, by applying the voltage from the power supply 18 between the electrodes 11 and 12, discharge plasma is generated between the electrodes 11 and 12. The types of the discharge plasma include arc plasma and glow plasma. Arc plasma is preferable for efficiently manufacturing the carbon nanotube.

When the arc discharge is generated, contact arc process may be conducted before the arc discharge generation. The contact arc process is a process in which after the voltage is applied while the electrodes 11 and 12 are in contact with each other, the moving apparatus 13 separates the electrodes 11 and 12 to a certain inter-electrode distance, and discharge plasma is generated. Through this process, stable discharge plasma is generated easily and quickly.

The voltage applied between the electrodes 11 and 12 may be a DC or an AC, but the DC is preferable for increasing the purity of the carbon nanotube to be obtained. Note that in the case of applying the AC, there is no distinction between the electrodes 11 and 12 in terms of polarity.

The current density of the discharge when the discharge plasma is generated is preferably 0.05 $A/mm^2$ or more and 15 $A/mm^2$ or less, and more preferably 1 $A/mm^2$ or more and 5 $A/mm^2$ or less with respect to the area of the forwardmost end portion of the electrode generating the discharge plasma. "The electrode generating the discharge plasma" indicates the cathode when the applied voltage is the DC, and indicates the electrode with the smaller forwardmost end portion area when the applied voltage is the AC (this holds true throughout the description in the present invention).

The voltage applied between the electrodes 11 and 12 by the power supply 18 is preferably 1 V or more and 30 V or less, and more preferably 15 V or more and 25 V or less. As a result of the discharge, the forward end portion of the electrode 12 is being consumed, so that the interval between the electrodes 11 and 12 changes during the discharge. It is preferable to control the voltage between the electrodes 11 and 12 to become constant by appropriately adjusting the interval between the electrodes 11 and 12 using the moving apparatus 13.

The period for applying the voltage is preferably set to 3 seconds or more and 180 seconds or less, and more preferably 5 seconds or more and 60 seconds or less. When the period is less than 3 seconds, the applied voltage is unstable, so that the purity of the carbon nanotube to be obtained may be reduced. When the period exceeds 180 seconds, the radiant heat due to the discharge plasma may reduce the magnetic flux density of the permanent magnets 20 to 23, or as a result of exceeding a Curie temperature, the magnetic field intensity may be lost. Thus, both the cases are not preferable.

In order to eliminate the defect due to the increase in temperature of the permanent magnets 20 to 23, the form is also preferable in which cooling means is provided for the permanent magnets 20 to 23. By providing the cooling means, the period for applying the voltage can be set to be longer. Examples of the cooling means include means formed by attaching a heat releasing member to the permanent magnets 20 to 23 and means for cooling the permanent magnets 20 to 23 with water.

FIGS. 27-a and 27-b are schematic views showing an example of the cooling means formed by attaching the heat releasing member to each of the permanent magnets 20 to 23, which is typified by the permanent magnet 20. FIG. 27-a is a side view around the permanent magnet attached with the heat releasing member, and FIG. 27-b is a front view observed from the right (the side of a surface to be opposed to the above-mentioned imaginary axis) of FIG. 27-a. In FIGS. 27-a and 27-b, the permanent magnet 20 indicated by dotted lines is embedded into a block-shaped copper lump 32 and covered with a copper lid 34, so as to be completely surrounded by a heat releasing member 30 composed of the copper lump 32 and the copper lid 34.

The heat of the permanent magnet 20 is released by the heat releasing member 30, so that the heat accumulation is suppressed. Note that as the material of the heat releasing member 30, copper is used in this example, but there is no limitation thereto. Any material high in heat conductivity can be adopted, and it is preferable to use a metal, in particular copper.

FIGS. 28-*a* and 28-*b* are schematic views showing an example of the cooling means formed by attaching the heat releasing member to each of the permanent magnets 20 to 23 and further subjecting this to water cooling. FIG. 28-*a* is a cross sectional view of the permanent magnets and a periphery of the electrode taken along a direction of side surfaces thereof, and FIG. 28-*b* is a cross sectional view taken along a line B-B of FIG. 28-*a*. In FIGS. 28-*a* and 28-*b*, the permanent magnets 20 to 23 indicated by dotted lines is in the same form as the state shown in FIGS. 27-*a* and 27-*b*, that is, completely surrounded by the heat releasing member 30. In addition, a tube 36 across the insides of the four heat releasing members 30 and a tube 38 surrounding the outsides of the four heat releasing members 30 are respectively installed, and water circulates through these tubes.

The heat of the permanent magnets 20 to 23 are released by the heat releasing members 30, and the heat releasing members 30 are further cooled with water circulating inside the tubes 36 and 38, so that effectively suppress the heating of the permanent magnets 20 to 23 is effectively suppressed. Note that a coolant circulating through the tubes 36 and 38 is not limited to water, and any conventionally known coolant, whether it is liquid or gas, can be used. Further, as the materials of the tubes 36 and 38, similarly to the heat releasing members 30, any material high in heat conductivity is preferable, and it is preferable to use a metal, in particular copper.

Incidentally, when discussing "the end portions in the imaginary axis direction" of the magnet to be discussed when each of the permanent magnets 20 to 23 is completely surrounded by the heat releasing member 30 are naturally determined by the position of each of the embedded permanent magnets 20 to 23, and are not affected by the positions of the heat releasing member 30 and tubes 36 and 38. Therefore, as shown in FIG. 28-*a*, the imaginary plane formed by connecting end portions on one side in the imaginary axis direction and the imaginary plane formed by connecting end portions on the other side are in the positions indicated by X' and Y'.

The magnetic flux density in the discharge area is preferably $10^{-5}$ T or more and 1 T or less in the forwardmost end portion of the electrode generating discharge plasma of the two opposing electrodes 11 and 12. When the magnetic flux density is less than $10^{-5}$ T, it is difficult to form an effective magnetic field, and when the magnetic flux density exceeds 1 T, it may be difficult to dispose the permanent magnets 20 to 23, which generate the magnetic field inside the apparatus, close to the generation area of the discharge plasma. Thus, both the cases are not preferable. When the magnetic flux density is $10^{-4}$ T or more and $10^{-2}$ T or less, the stable discharge is generated, thereby making it possible to efficiently produce a carbon nanotube.

When the discharge plasma is generated between the electrodes 11 and 12 as described above, carbon is separated from the surface of the electrode 11, and then reacts to produce carbon nanotubes. The produced carbon nanotubes are deposited mainly on the surface of the forwardmost end portion of the electrode 11 or in a periphery thereof.

As has been described above, according to this embodiment mode, it is possible to manufacture an extremely high density carbon nanotube with ease at low costs while using the discharge plasma method such as arc discharge. In particular, depending on the conditions, the purity of the carbon nanotube can be 95% or more.

Embodiment Mode 2

Next, a description will be given of a manufacturing apparatus for a carbon nanotube according to Embodiment Mode 2 of the present invention, which achieves a massproductivity of the carbon nanotubes at a higher level. FIG. 29 is a schematic cross sectional view showing the manufacturing apparatus for a carbon nanotube according to Embodiment Mode 2 of the present invention. The manufacturing apparatus of this embodiment mode has the same structure as the manufacturing apparatus according to Embodiment Mode 1, but differs therefrom in terms of arrangement of the cathodes and holding method therefor. Both the apparatuses basically are the same except for the above. Thus, in FIG. 29, members having the same function as those in Embodiment Mode 1 are denoted by the same reference numerals as in FIG. 1 and a detailed description thereof will be omitted here.

Figure 30:
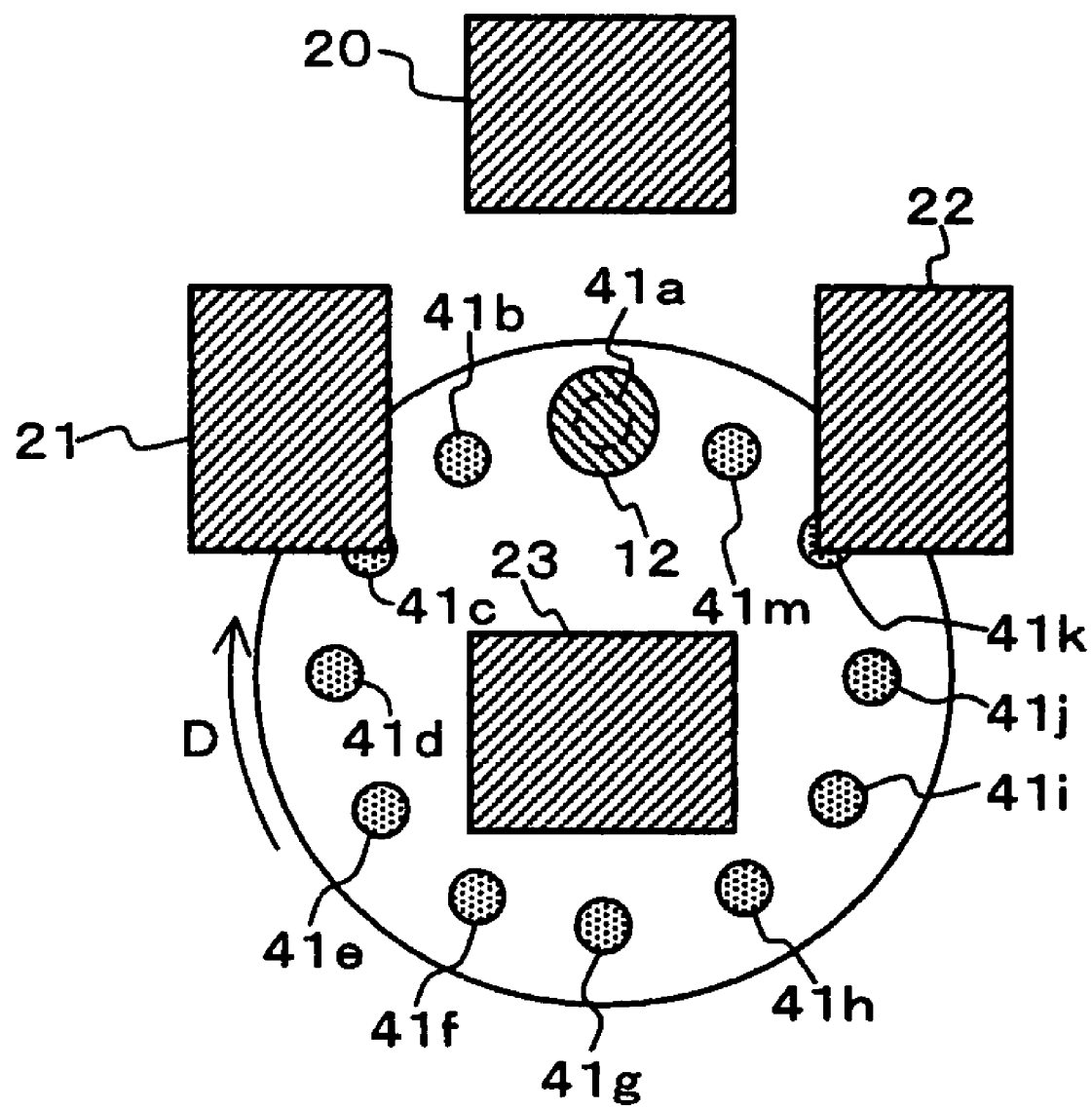
FIG. 30 is a cross sectional view (cross sectional view of only permanent magnets, electrodes, and a holding member) taken along a line C-C of FIG. 29.

In this embodiment mode, any one selected from the rod-shaped electrode group 41 arranged on a disc-like holding member 42 in a bristling manner constitutes a cathode corresponding to "the other electrode" in the present invention. FIG. 30 is a cross sectional view (cross sectional view only showing permanent magnets, electrodes, and the holding member) taken along the line C-C of FIG. 29. As shown in FIG. 29, the rod-shaped electrode group 41 has 12 rod-shaped electrodes 41*a* to 41*m* arranged in a bristling manner on the holding member 42 concentrically with the holding member. Each of the rod-shaped electrodes 41*a* to 41*m* is electrically connected with the power supply 18 through the holding member 42. Also, the holding member 42 is arranged rotatably in the direction of the arrow D.

In the state shown in FIG. 30, the rod-shaped electrode 41*a* (indicated by the dotted line in FIG. 30) positioned just below the electrode 12 and opposed thereto serves as the cathode corresponding to "the other electrode" in the present invention. However, through the rotation of the holding member 42 in the direction of the arrow D, the other rod-shaped electrodes 41*b* to 41*m* can be each positioned just below the electrode 12 and opposed thereto, and thus can serve as the cathode corresponding to "the other electrode" in the present invention. At this time, the rod-shaped electrodes 41*a* to 41*m* each serving as "the other electrode" in the present invention are located in the area outside the area F, that is, below the permanent magnets 20 to 23. Therefore, no matter how the holding member 42 rotates, there is no obstacle to its rotation. As a result, the holding member can freely rotate.

Assuming here that the voltage is applied between the electrode 12 and the rod-shaped electrode 41*a* from the power supply 18 to thereby generate the discharge plasma between both the electrodes, the carbon nanotubes are produced and deposited at the forwardmost end portion of the rod-shaped electrode 41*a* and its vicinity. After the completion of the voltage application, the holding member 42 is rotated in the direction of the arrow D, so that the rod-shaped electrode 41*b* is positioned just below the electrode 12 this time. In this state, the voltage is applied between the electrode 12 and the rod-shaped electrode 41*b* from the power supply 18. In this way, the carbon nanotubes grow and are deposited at the forwardmost end portion of the rod-shaped electrode 41b and its vicinity. This operation is repeatedly performed on the rod-shaped electrodes 41c to 41m as well. Thus, the carbon nanotubes grow and are deposited at the forward most end portion of each of the 12 rod-shaped electrodes 41a to 41m and its vicinity in succession. In other words, according to the manufacturing apparatus for the carbon nanotube of this embodiment mode, high productivity can be achieved while maintaining extremely high purity of the produced carbon nanotube.

The rod-shaped electrodes 41a to 41m where the carbon nanotubes are deposited can be each replaced as they are on the basis of the holding member 23. Alternatively, while rotating the holding member 23, the electrodes located at the positions of the rod-shaped electrodes 41d to 41j in the figure are first removed and new ones may be reset. The carbon nanotubes deposited in the forwardmost end portion of each of the collected rod-shaped electrodes 41a to 41m and its vicinity are collected by scraping off or drawing the carbon nanotubes as appropriate. This enables the efficient mass production of the carbon nanotubes with high purity.

Also, instead of collecting the rod-shaped electrodes 41a to 41m, while rotating the holding member 23 as it is, the carbon nanotubes deposited in the forwardmost end portion of each of the electrodes located at the positions of the rod-shaped electrodes 41d to 41j in the figure can be first collected as well by scraping off or drawing the carbon nanotubes as appropriate. In this case, each of the rod-shaped electrodes 41a to 41m after the carbon nanotubes are collected can be used again for the generation of the discharge plasma.

Note that in this embodiment mode, the form in which the number of rod-shaped electrodes is 12 has been described. However, no particular limitation is imposed on the number thereof, and as many electrodes as desired can be used from the viewpoint of efficient mass production of the carbon nanotubes. Even if only one rod-shaped electrode is arranged on the holding member 42, the electrode is moved to a large space where the permanent magnets 20 to 23 are not positioned above the electrode before the various operations such as the electrode replacement or the collection of the carbon nanotubes can be made. Thus, the high operability can be obtained.

Also, in this embodiment mode, the case in which the disc-like holding member 42 is used has been described by way of example. However, no particular limitation is imposed on the shape of the holding member. The holding member may take, for example, a long-plate shape, on which the rod-shaped electrodes are linearly bristled. Alternatively, the holding member may take a rectangular shape, on which the rod-shaped electrodes are bristled two-dimensionally, for example, in parallel, in a zigzag form, or at random. The holding member may take another shape or a flexible belt-like shape.

Embodiment Mode 3

Figure 31:
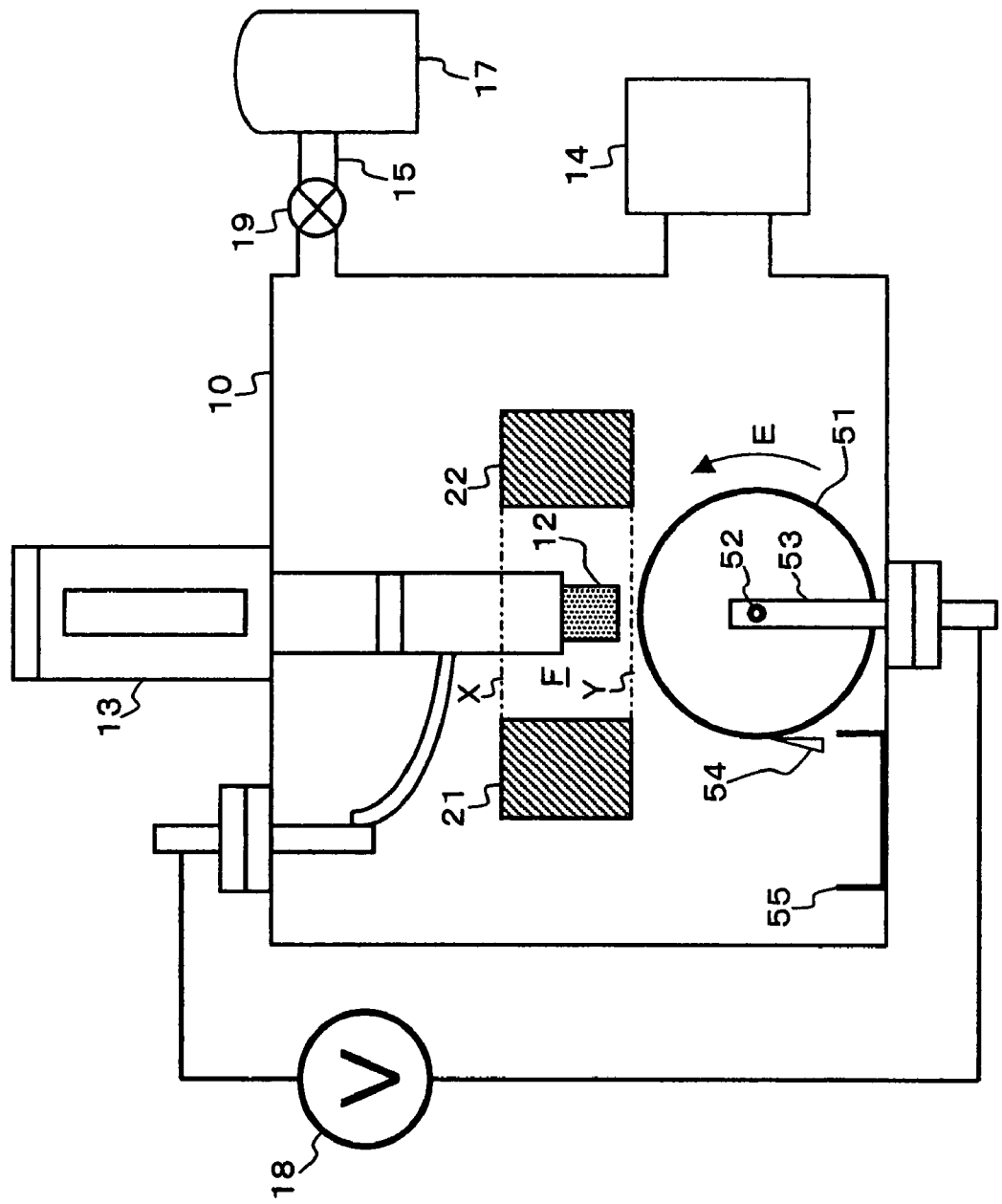
FIG. 31 is a schematic cross sectional view showing a manufacturing apparatus for a carbon nanotube according to Embodiment Mode 3 of the present invention.

Next, a description will be given of a manufacturing apparatus for a carbon nanotube according to Embodiment Mode 3 of the present invention, which includes collecting means having a mechanism for scraping the carbon nanotubes and achieves mass-productivity of the carbon nanotubes at a higher level. FIG. 31 is a schematic cross sectional view showing the manufacturing apparatus for a carbon nanotube according to Embodiment Mode 3 of the present invention. The manufacturing apparatus of this embodiment mode has the same structure as the manufacturing apparatus according to Embodiment Mode 1, but differs therefrom in terms of arrangement of the cathodes and provision of the collecting means. Both the apparatuses basically are the same except for the above. Thus, in FIG. 31, members having the same function as that in Embodiment Mode 1 are denoted by the same reference numeral as in FIG. 1, and a detailed description thereof will be omitted here.

As shown in FIG. 31, a drum-like rotary member 51 is arranged with its peripheral surface opposite to the electrode 12. In this embodiment mode, the rotary member 51 constitutes the cathode corresponding to "the other electrode" in the present invention. As mentioned above, the electrode having the shape other than the rod shape can be used as the electrode in the present invention as far as the electrode contributes to the generation of the discharge plasma. In this case, the portion of the peripheral surface of the rotary member 51 opposite to the electrode 12 corresponds to "the forwardmost end portion" specified in the present invention.

The rotary member 51 is pivotally supported by a support 53 about an axis 52 while freely rotating in the direction of the arrow E by an unillustrated rotating apparatus. At this time, the rotary member 51 corresponding to "the other electrode" in the present invention is located in the area outside the area F, that is, below the permanent magnets 20 to 23. Therefore, there is no obstacle to its rotation, so that the rotary member 51 can freely rotate.

Note that the rotary member 51 is electrically connected with the power supply 18 through the support 53 and the axis 52.

Figure 32:
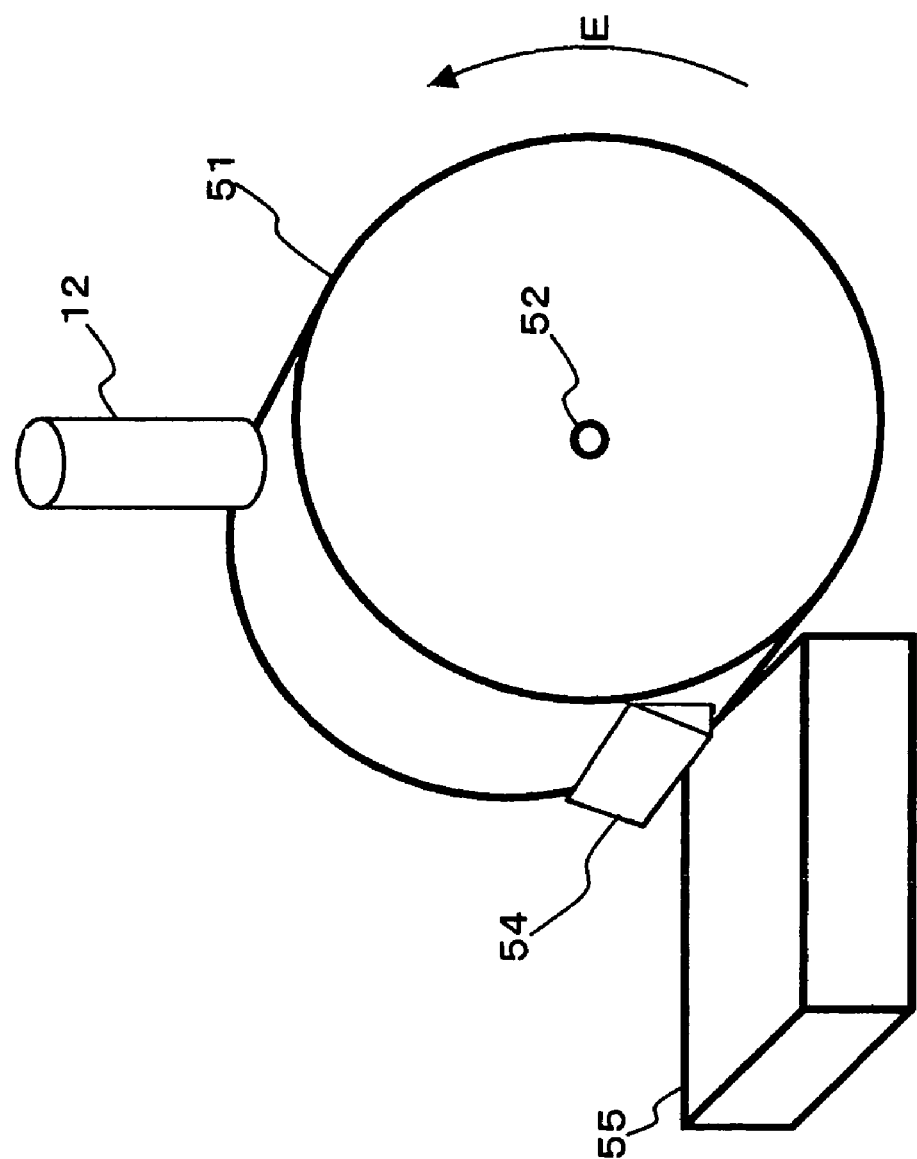
FIG. 32 is an enlarged perspective view showing only a rotary member and collecting means in a periphery there of which are extracted from FIG. 31.

FIG. 32 is an enlarged perspective view of only the rotary member corresponding to the cathode in this embodiment mode and the collecting means in the vicinity thereof in an extracted fashion. As shown in FIG. 31 and FIG. 32, on the downstream side of a site of the rotary member 51 opposite to the electrode 12 in the rotating direction thereof (direction of the arrow E), a blade 54 is disposed and abutted against the peripheral surface of the rotary member 51 at an acute angle. Also, a carbon nanotube container 55 is disposed below the abutment portion.

Assuming here that the voltage is applied between the electrode 12 and the rotary member 51 from the power supply 18 to thereby generate the discharge plasma between both the electrodes, the carbon nanotubes are produced and deposited on the peripheral surface of the rotary member 51. After the completion of the voltage application, the rotary member 51 is rotated in the direction of the arrow E up to the position at which the portion where the carbon nanotubes are deposited is abutted against the blade 54. At this position, the carbon nanotubes are scraped off by the blade 54. The scraped carbon nanotubes fall by gravitation to be received in the carbon nanotube container 55.

Also, after the completion of the voltage application, the carbon nanotubes are produced/deposited at a predetermined portion on the peripheral surface of the rotary member 51. After that, the rotary member 51 is slightly rotated to set another portion on the peripheral surface of the rotary member so as to oppose the electrode 12. Then, the power supply 18 applies the voltage between the electrode 12 and the rotary member 51, so that the carton nanotubes grow and are deposited at the newly set portion on the peripheral surface of the rotary member 51 as well. This operation is repeatedly performed to thereby have the carbon nanotubes produced/deposited on the peripheral surface of the rotary member 51 successively. Thus, the portion where the carbon nanotubes are deposited ahead of the other portions reaches the position where the blade 54 is abutted against the rotary member. Thus, the carbon nanotubes thereon are automatically scraped off by the action of the blade 54. In other words, according to the manufacturing apparatus for the carbon nanotube of this embodiment mode, the carbon nanotubes can be mass-produced successively with high productivity while maintaining extremely high purity of the produced carbon nanotube.

Note that, in this embodiment mode, the form in which the blade and the container are used in combination as the collecting means has been described by way of example. However, the collecting means in the present invention is not limited to this. For example, as the member for scraping the deposited carbon nanotubes, a brush, sponge, etc. can be used instead of using the blade. As another structure, an adhesive may be used to adhere the carbon nanotubes thereto.

Also regarding the form of the electrode, in this embodiment mode, "the other electrode" has the drum-like shape for convenience of apparatus structure. However, the electrode is not limited to this but may take the rod shape as in the general cases and a polyhedral shape like a cube etc., and in addition, a belt-like shape.

Given as a modification of the collecting means is a mechanism for drawing the deposited carbon nanotubes, which is provided without changing the form of Embodiment Mode 1 or is applicable to any other forms. For example, there can be given a mechanism in which a suction apparatus utilizing the reduced pressure is prepared, pipes for suction are provided, and openings (suction openings) at end portions thereof are caused to approach the forwardmost end portion of the electrode where the carbon nanotubes are deposited to directly take in the carbon nanotubes. The suction opening is not always needed to approach the forwardmost end portion of the electrode, but the suction opening may be formed so as to approach the electrode after the carbon nanotubes are deposited (needless to say, even if the suction opening approaches the forwardmost end portion of the electrode all the time, there arises no problem provided that an ON/OFF control is made on the operation of the suction apparatus).

In any case, according to the manufacturing apparatus for the carbon nanotube of the present invention, the cathode where the growth/deposition of the carbon nanotubes takes place is surrounded by the magnetic pole surfaces of the plural magnets or positioned outside the surrounded area. Thus, various collecting means can be easily set. As a result, by providing the various collecting means, extremely high productivity can be ensured while maintaining the high purity of the carbon nanotube.

MORE SPECIFIC EXAMPLE

Hereinafter, the present invention will be specifically described based on an example. However, the present invention is not limited to the example.

In this example, the carbon nanotubes are manufactured mainly using the manufacturing apparatus for the carbon nanotube shown in FIG. 1. Note that the manufacturing apparatus equipped with the cooling means with the structure shown in FIG. 28-a and FIG. 28-b is used.

Specific conditions for the respective structures are as follows.

Reaction container 10: A cylindrical container chamber made of stainless steel with a diameter of 210 mm and a length of 380 mm.

Electrode (cathode) 11: A cylindrical graphite rod with an outer diameter of 5 mm (purity: 99.9% or more).

Electrode (anode) 12: A cylindrical graphite rod with an outer diameter of 15 mm (purity: 99.9% or more).

Forwardmost end portion position of the electrode 11: A distance from the midpoint between the imaginary plane X and the imaginary plane Y (hereinafter, abbreviated to h in some cases) is set to the following 4 levels:

(1) h=0 mm (midpoint between the imaginary plane X and the imaginary plane Y: within the area F)

(2) h=3 mm below the midpoint (8 mm above the imaginary plane Y: within the area F)

(3) h=9 mm below the midpoint (2 mm above the imaginary plane Y: within the area F)

(4) h=15 mm below the midpoint (4 mm below the imaginary plane Y: outside the area F)

Moving apparatus 13: An apparatus makes the electrode 11 movable with a stepping motor, with such an adjustment as to keep a distance between the electrodes 11 and 12 constant during the plasma discharge.

Power supply 18: ADC arc welding power supply (AR-SB300 manufactured by OSAKA DENKI KIKOU Co., LTD.) capable of controlling the current value from 20 A to 300 A.

Permanent magnets 20 to 23: Cylindrical NdFB permanent magnets with a diameter of 22 mm and a thickness of 10 mm (diameter: 22 mm, thickness: 10 mm, manufactured by Niroku Seisakusho). The permanent magnets 20 to 23 are incorporated as the cooling means as shown in FIG. 28-a and FIG. 28-b. At this time, in more detail, as shown in FIG. 27-a and FIG. 27-b, the permanent magnets 20 to 23 are embedded into the heat releasing member 30 made of copper (length: 50 mm, width: 40 mm, thickness: 25 mm, and thickness of the copper cover 34: 2.5 mm). The copper-made tubes 36 and 38 are further routed, the coolant is circulated through the tubes 36 and 38, and the temperature is controlled so as to maintain the temperature of the permanent magnets 20 to 23 below 100° C. during the discharge. As a result, the temperature of the permanent magnets 20 to 23 does not exceed Curie point during the discharge. The minimum distance between the opposing permanent magnets is 82 mm. The magnetic flux density at the edge of the forwardmost end portion of the electrode 11 is 7 mT.

The manufacturing apparatus described above was used to manufacture the carbon nanotubes. The inside of the reaction container 10 was not decompressed, and the operation was conducted in the atmosphere at 101.325 kPa (1 atmospheric pressure). To generate arc discharge between the electrodes 11 and 12, the contact arc process was conducted first, and then, the electrodes 11 and 12 were separated by about 1 mm to 3 mm after the start of the discharge. The voltage applied by the power supply 18 was a DC voltage of 25 V to 30 V. The distance between the electrodes was adjusted so as to keep the voltage constant. The arc discharge was conducted under the above conditions for about 1 minute. The current value was 80 A, and the discharge current density with respect to the forwardmost end portion area of the electrode 11 was 4.1 A/mm$^2$.

After the discharge, the electrode 11 was taken out, and the forwardmost end portion was observed using a scanning electron microscope. For the observation using the scanning electron microscope, a scanning electron microscope S-4500 manufactured by Hitachi Ltd., was used. Through the observation using the scanning electron microscope, it has been confirmed that the high-purity carbon nanotube is produced irrespective of the position of the forwardmost end portion of the electrode 11. As the distance h from the midpoint between the imaginary plane X and the imaginary plane Y becomes large, the purity is more increased. It has been confirmed that in the case of the distance of 9 mm or more, almost no purity is observed. Also, when h=15 mm, no purity is observed through the observation on the photograph.

Figure 33:
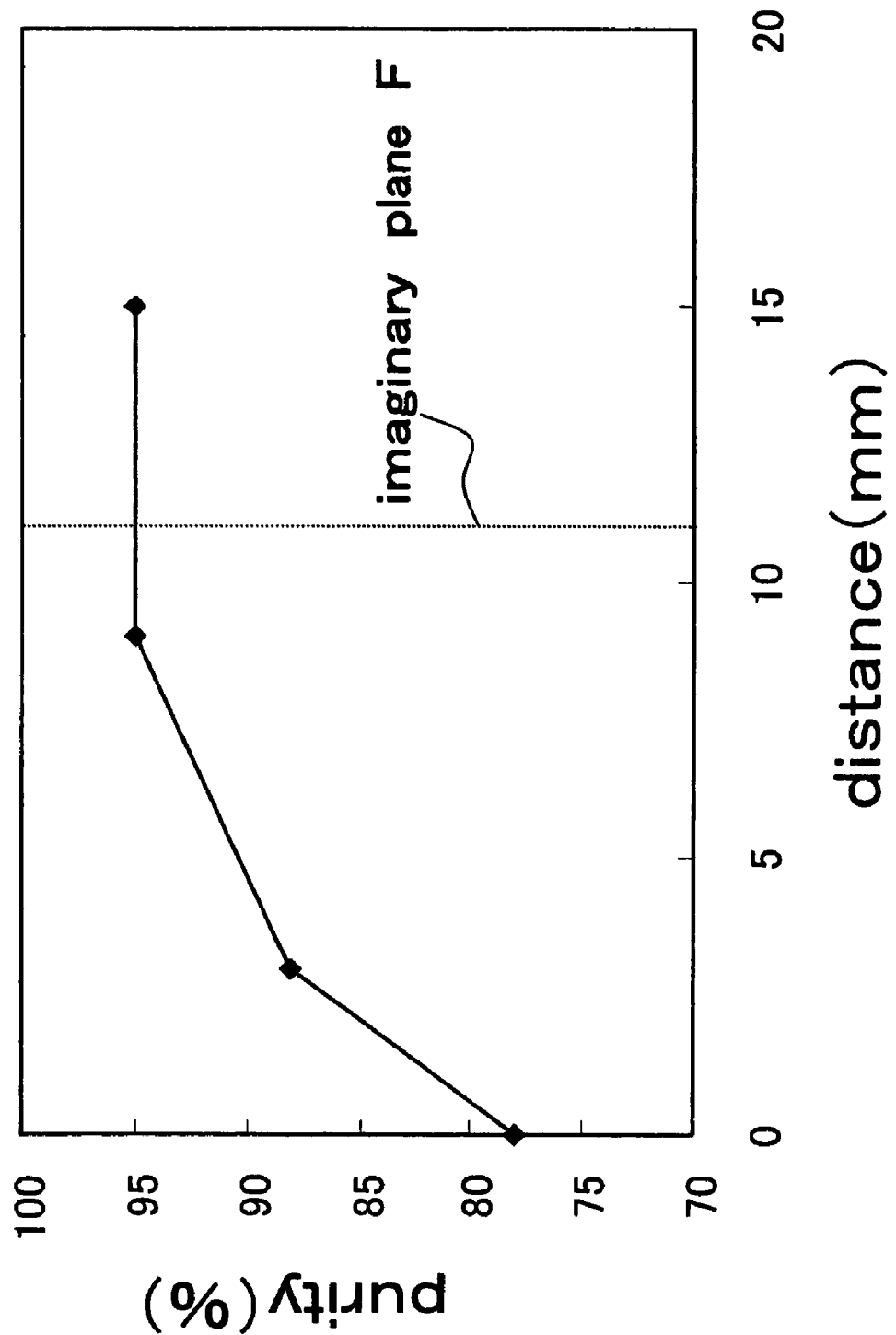
FIG. 33 is a graph showing a transition of a pertinent purity based on a position of a forwardmost end portion of "the other electrode" (a distance h from a midpoint between an imaginary plane X and an imaginary plane Y) in an example.

Through the image processing on the scanning electron microscope image, the purity of the carbon nanotube is estimated. FIG. 33 is a graph showing a transition of the purity according to the position of the forwardmost end portion of the electrode 11 (distance h from the midpoint between the imaginary plane X and the imaginary plane Y). In the case where (4) the distance is 15 mm below the midpoint between the imaginary plane X and the imaginary plane Y, the purity is 95% or more.

Figure 34:
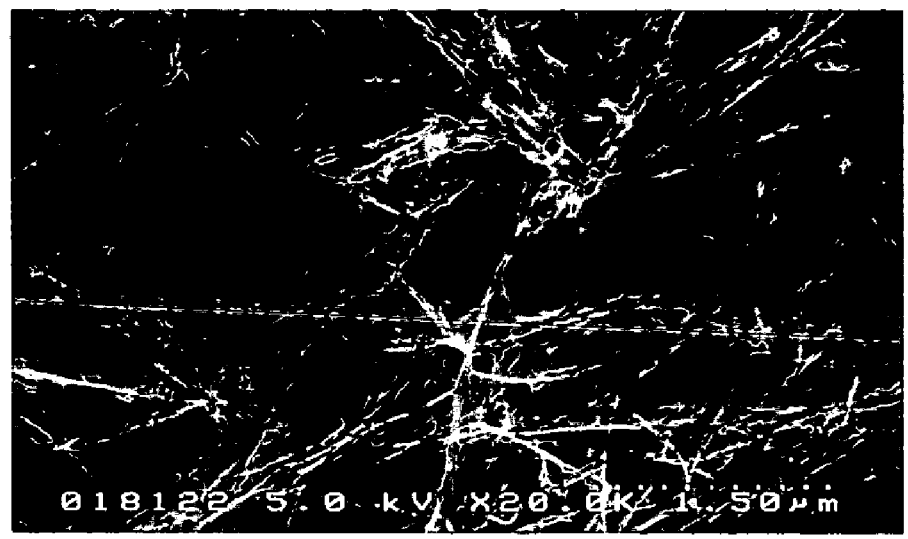
FIG. 34 is a scanning electron microscope photograph (at a magnifying power of 20000) of the forwardmost end portion of "the other electrode" when h=9 mm.
Figure 35:
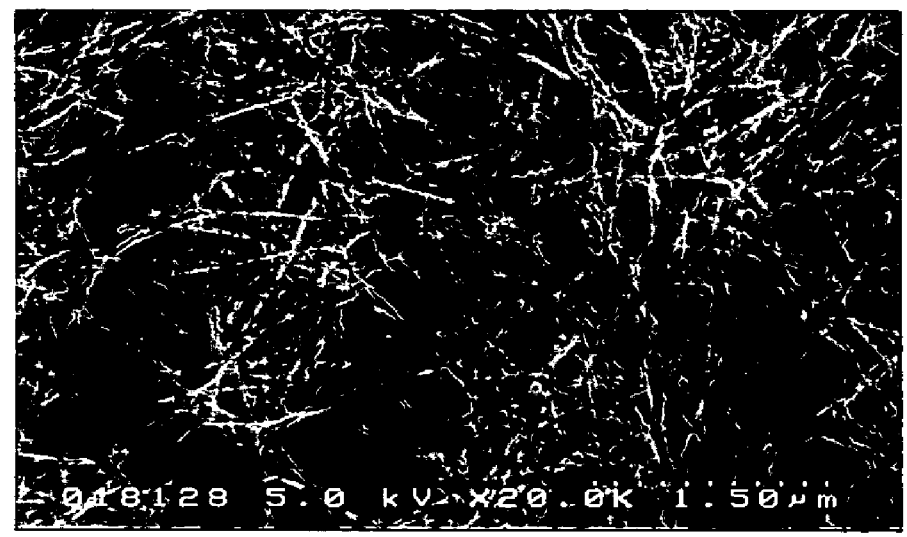
FIG. 35 is a scanning electron microscope photograph (at a magnifying power of 20000) of the forwardmost end portion of "the other electrode" when h=15 mm.

Also, regarding the position of the forwardmost end portion of the electrode 11, when (3) h=9 mm as the distance from the midpoint between the imaginary plane X and the imaginary plane Y and (4) h=15 mm, scanning electron microscope photographs of the forwardmost end portion of the electrode 11 in the respective cases are shown in FIG. 34 and FIG. 35.

As described above, the condition of the magnetic field is optimized, so that the carbon nanotubes with the extremely high purity can be directly synthesized without using any catalyst or involving any purification process.

INDUSTRIAL APPLICABILITY

According to the present invention, it is possible to efficiently synthesize the high-purity carbon nanotubes such as amorphous carbon particles and the graphite particles with extremely low impurity concentration on an industrial scale. In particular, according to the present invention, the mass-production of the high-purity carbon nanotubes can be achieved on the industrial scale based on the form thereof.

The invention claimed is:

1. A manufacturing apparatus for a carbon nanotube, comprising: at least two electrodes whose forwardmost end portions are opposed to each other; a power supply for applying a voltage between the electrodes in order to generate discharge plasma in a discharge area between the electrodes; and plural magnets configured to form a magnetic field in a generation area of the discharge plasma by generating a magnetic field from a magnetic pole surface of each of the plural magnets, characterized in that:
the plural magnets are arranged to have the magnetic pole surfaces thereof opposed to one imaginary axis within a space; and
of the two electrodes, at least a part of one electrode is located in an area surrounded by: an imaginary plane formed by connecting end portions of the magnetic pole surfaces of the plural magnets on one side in a direction of the imaginary axis; an imaginary plane formed by connecting end portions thereof on the other side; and the magnetic pole surfaces of the plural magnets, and the forwardmost end portion of the other electrode is located in an area outside the area surrounded by the two imaginary planes and the magnetic pole surfaces.

2. A manufacturing apparatus for a carbon nanotube of claim 1, characterized in that the one electrode is an anode.

3. A manufacturing apparatus for a carbon nanotube of claim 2, characterized in that plural rod-shaped electrodes are placed in parallel in a bristling manner, and any one of the rod-shaped electrodes has a forwardmost end portion opposed to the forwardmost end portion of the one electrode and can be moved to a position so as to serve as the other electrode.

4. A manufacturing apparatus for a carbon nanotube nanotube of claim 2, characterized by comprising collecting means for collecting carbon nanotubes that are manufactured by generating discharge plasma between the two electrodes and remain adhering to the forwardmost end portion of the other electrode.

5. A manufacturing apparatus for a carbon nanotube of claim 4, characterized in that the collecting means has a mechanism for scraping off the carbon nanotubes adhering to the forwardmost end portion of the other electrode.

6. A manufacturing apparatus for a carbon nanotube of claim 4, characterized in that the collecting means has a mechanism for drawing the carbon nanotubes adhering to the forwardmost end portion of the other electrode.

7. A manufacturing apparatus for a carbon nanotube of claim 1, characterized in that the discharge plasma generated in the discharge area is arc plasma.

8. A manufacturing apparatus for a carbon nanotube of claim 1, characterized in that the plural magnets are arranged to surround the one electrode such that all the magnetic pole surfaces of the same poles are opposed to the imaginary axis.

9. A manufacturing apparatus for a carbon nanotube of claim 1, characterized in that the even number of magnets, equal to or greater than four, are arranged to surround the one electrode such that each magnetic pole surface opposed to the imaginary axis has a pole alternately opposite to that of the adjacent magnetic pole surface.

10. A manufacturing apparatus for a carbon nanotube of claim 1, characterized in that, of the two electrodes, the electrode that generates the discharge plasma has a magnetic flux density of $10^{-5}$ T or more and 1 T or less at an edge of the forwardmost end portion thereof.

11. A manufacturing apparatus for a carbon nanotube of claim 1, characterized in that a density of a discharge current at a time of generating the discharge plasma is 0.05 A/mm$^2$ or more and 15 A/mm$^2$ or less with respect to an area of the forwardmost end portion of the electrode that generates the discharge plasma.

12. A manufacturing apparatus for a carbon nanotube of claim 1, characterized in that the voltage applied to the electrodes by the power supply is 1 V or more and 30 V or less.

13. A manufacturing apparatus for a carbon nanotube of claim 1, characterized in that an area of the forwardmost end portion of a cathode of the two electrodes is equal to or less than the area of the forwardmost end portion of the anode thereof.

14. A manufacturing apparatus for a carbon nanotube of claim 1, characterized in that at least the discharge area and the two electrodes are received in a sealed container.

15. A manufacturing apparatus for a carbon nanotube of claim 1, characterized in that at least the discharge area and the two electrodes are received in the sealed container, and atmosphere adjusting means capable of adjusting an atmosphere inside a sealed container is provided.

16. A manufacturing apparatus for a carbon nanotube of claim 1, characterized in that the material of the electrodes is carbon or a substance that contains carbon and has an electric resistivity equal to or more than 0.01 Ω·cm and equal to or less than 10 Ω·cm.

17. A manufacturing method for a carbon nanotube, characterized in that: the manufacturing apparatus for a carbon nanotube of claim 1 is used; and by applying a voltage between the two electrodes inside the manufacturing apparatus, discharge plasma is generated in a discharge area between the electrodes to thereby manufacture the carbon nanotube.

18. A manufacturing method for a carbon nanotube of claim 17, characterized in that a voltage applied between the two electrodes is a DC voltage such that the one electrode of the manufacturing apparatus for a carbon nanotube as described in (1) is an anode.

19. A manufacturing method for a carbon nanotube of claim 17, characterized in that the discharge plasma generated in the discharge area is arc plasma.

20. A manufacturing method for a carbon nanotube of claim 17, characterized in that a pressure of an atmosphere of the discharge area is 0.01 Pa or more and 510 kPa or less.

21. A manufacturing method for a carbon nanotube of claim 17, characterized in that an atmosphere of the discharge area is a gas atmosphere that contains at least one of gases selected from air, helium, argon, xenon, neon, nitrogen, and hydrogen.

22. A manufacturing method for a carbon nanotube characterized in that an atmosphere of the discharge area further includes a gas that is composed of a substance containing carbon.

* * * * *